US010678823B2

(12) United States Patent
Tacchi et al.

(10) Patent No.: US 10,678,823 B2
(45) Date of Patent: *Jun. 9, 2020

(54) FACILITATING TARGETED ANALYSIS VIA GRAPH GENERATION BASED ON AN INFLUENCING PARAMETER

(71) Applicant: Quid, Inc., San Francisco, CA (US)

(72) Inventors: Ruggero Altair Tacchi, San Francisco, CA (US); Fabio Ciulla, San Francisco, CA (US)

(73) Assignee: Quid, Inc., San Francisco, CA (US)

( * ) Notice: Subject to any disclaimer, the term of this patent is extended or adjusted under 35 U.S.C. 154(b) by 456 days.

This patent is subject to a terminal disclaimer.

(21) Appl. No.: 15/379,848

(22) Filed: Dec. 15, 2016

(65) Prior Publication Data

US 2017/0329844 A1  Nov. 16, 2017

Related U.S. Application Data

(63) Continuation of application No. 15/153,001, filed on May 12, 2016, now Pat. No. 9,558,265.

(51) Int. Cl.
*G06F 16/338* (2019.01)
*G06F 16/901* (2019.01)
(Continued)

(52) U.S. Cl.
CPC ........ *G06F 16/338* (2019.01); *G06F 16/9024* (2019.01); *G06N 5/022* (2013.01); *G06N 5/04* (2013.01); *G06N 20/00* (2019.01)

(58) Field of Classification Search
CPC ..... G06F 16/338; G06F 16/9024; G06N 5/04; G06N 5/048; G06N 5/022; G06N 20/00
(Continued)

(56) References Cited

U.S. PATENT DOCUMENTS 7,890,510 B2 * 2/2011 Aggarwal ............. G06Q 10/00
706/12
8,065,302 B2 * 11/2011 Sridhar .................. G06F 16/70
707/736
(Continued)

OTHER PUBLICATIONS

Zhang et al., "Inferring Individual Influence in Social Network", 2012 Ninth Web Information Systems and Applications Conference, IEEE, 2012, pp. 147-152. (Year: 2012).*
(Continued)

*Primary Examiner* — Phuong Thao Cao
(74) *Attorney, Agent, or Firm* — Pillsbury Winthrop Shaw Pittman, LLP

(57) ABSTRACT

Provided is a process including: obtaining a graph comprising nodes and edges, each of the edges having a value indicating an amount of similarity between objects corresponding to the two linked nodes; selecting a parameter for influencing the graph; assessing each of the nodes based on the selected influencing parameter, wherein assessing comprises, with respect to each adjacent node in the graph sharing an edge with the node: determining the value indicating the amount of similarity between the object corresponding to the node and the object corresponding to the adjacent node; and determining a score related to the edge shared with the node, the score determined based on the similarity-amount value and a value of the selected influencing parameter for the node, such that edges are removed, weakened, added, or strengthened; and preparing, based on the graph, instructions to display at least part of the graph.

20 Claims, 5 Drawing Sheets

(51) Int. Cl.
*G06N 5/02* (2006.01)
*G06N 5/04* (2006.01)
*G06N 20/00* (2019.01)

(58) Field of Classification Search
USPC ........................................................ 707/736
See application file for complete search history.

(56) References Cited

U.S. PATENT DOCUMENTS

| | | | | |
|---|---|---|---|---|
| 8,095,546 | B1* | 1/2012 | Baluja | G06F 17/2705 |
| | | | | 707/750 |
| 8,311,741 | B1* | 11/2012 | Lawther | G01C 21/3461 |
| | | | | 701/527 |
| 8,452,755 | B1* | 5/2013 | Ye | G06F 16/38 |
| | | | | 707/715 |
| 8,736,612 | B1* | 5/2014 | Goldman | G06Q 50/01 |
| | | | | 345/440 |
| 8,983,948 | B1* | 3/2015 | Haugen | G06F 16/9535 |
| | | | | 707/728 |
| 9,087,088 | B1* | 7/2015 | Bose | G06Q 30/0276 |
| 9,135,653 | B2* | 9/2015 | Vaynblat | G06Q 50/01 |
| 9,342,624 | B1* | 5/2016 | Ojha | G06Q 10/10 |
| 9,798,876 | B1* | 10/2017 | Parker-Wood | G06F 21/554 |
| 10,115,115 | B2* | 10/2018 | Werneck | G06F 16/903 |
| 10,152,544 | B1* | 12/2018 | Friggeri | G06F 16/9535 |
| 2007/0011659 | A1* | 1/2007 | Venolia | G06F 16/904 |
| | | | | 717/127 |
| 2009/0276389 | A1* | 11/2009 | Constantine | G06N 7/005 |
| | | | | 706/52 |
| 2010/0211924 | A1* | 8/2010 | Begel | G06F 8/74 |
| | | | | 717/101 |
| 2010/0281025 | A1* | 11/2010 | Tsatsou | G06F 16/335 |
| | | | | 707/733 |
| 2011/0099167 | A1* | 4/2011 | Galbreath | H04L 65/403 |
| | | | | 707/736 |
| 2011/0131208 | A1* | 6/2011 | Goldfarb | G06Q 30/02 |
| | | | | 707/736 |
| 2011/0179084 | A1* | 7/2011 | Waddington | G06Q 30/02 |
| | | | | 707/794 |
| 2012/0330939 | A1* | 12/2012 | McCloskey | G06Q 30/02 |
| | | | | 707/723 |
| 2013/0124309 | A1* | 5/2013 | Traasdahl | H04L 67/22 |
| | | | | 705/14.49 |
| 2013/0142438 | A1* | 6/2013 | Schloegel | G06T 17/005 |
| | | | | 382/199 |
| 2013/0218865 | A1* | 8/2013 | Angulo | H04L 67/22 |
| | | | | 707/709 |
| 2013/0226840 | A1* | 8/2013 | Zhang | G06F 16/9024 |
| | | | | 706/12 |
| 2014/0074764 | A1* | 3/2014 | Duftler | G06N 5/025 |
| | | | | 706/47 |
| 2015/0039431 | A1* | 2/2015 | Sarshar | G06Q 30/0256 |
| | | | | 705/14.54 |
| 2015/0066663 | A1* | 3/2015 | Vaynblat | G06Q 50/01 |
| | | | | 705/14.71 |
| 2015/0120721 | A1* | 4/2015 | Kim | H04L 67/10 |
| | | | | 707/728 |
| 2015/0324483 | A1* | 11/2015 | Chun | G06Q 30/0281 |
| | | | | 707/741 |
| 2015/0332344 | A1* | 11/2015 | Vaynblat | G06Q 50/01 |
| | | | | 705/14.53 |
| 2015/0363476 | A1* | 12/2015 | Li | G06F 16/258 |
| | | | | 707/714 |
| 2016/0078148 | A1* | 3/2016 | Werneck | G06Q 50/01 |
| | | | | 707/798 |
| 2016/0117322 | A1* | 4/2016 | Ramaswamy | G06F 16/164 |
| | | | | 707/756 |
| 2016/0117358 | A1* | 4/2016 | Schmid | G06F 16/24 |
| | | | | 707/736 |
| 2016/0197873 | A1* | 7/2016 | Alghamdi | H04L 51/32 |
| | | | | 709/206 |
| 2016/0283849 | A1* | 9/2016 | Kozloski | G06N 5/043 |
| 2016/0299975 | A1* | 10/2016 | Acar | G06N 5/022 |
| 2016/0371271 | A1* | 12/2016 | Bhatia | G06F 16/9535 |
| 2017/0076206 | A1* | 3/2017 | Lastras-Montano | |
| | | | | G06F 16/3344 |
| 2017/0235817 | A1* | 8/2017 | Deodhar | G06F 16/285 |
| | | | | 707/736 |

OTHER PUBLICATIONS

Bothorel et al., "Clustering Attributed Graphs: Models, Measures and Methods", arXiv:1501.01676v1 [cs.SI], Jan. 7, 2015, 40 pages (Year: 2015).*

* cited by examiner

FACILITATING TARGETED ANALYSIS VIA GRAPH GENERATION BASED ON AN INFLUENCING PARAMETER

CROSS-REFERENCE TO RELATED APPLICATIONS

The present patent application is a continuation of U.S. patent application Ser. No. 15/153,001, filed 12 May 2016, now U.S. Pat. No. 9,558,265, having the same title, the entire content of which is hereby incorporated by reference.

BACKGROUND

1. Field

The present invention relates generally to computational analyses and, more specifically, to facilitating targeted analysis via graph generation based on an influencing parameter.

2. Description of the Related Art

Often people wish to draw inferences based on information contained in, and distributed among, relatively large collections of documents, e.g., substantially more documents than they have time to read or the cognitive capacity to analyze. Certain types of inferences implicate relationships between those documents. For example, it may be useful to organize documents by the subject matter described in the documents, sentiments expressed in the documents, or topics addressed in the documents. In many cases, useful insights can be derived from such organization, for example, discovering taxonomies, ontologies, relationships, or trends that emerge from the analysis. Examples might include organizing restaurants based on restaurant reviews, organizing companies based on content in company websites, organizing current events or public figures based on new stories, and organizing movies based on dialogue.

One family of techniques for making such inferences is computational linguistic analysis of text, such as unstructured text, within the documents of a corpus, e.g., with natural language processing techniques, like those based on distributional semantics. Computers are often used to perform semantic similarity analyses within corpora to gauge document pair-wise similarity of the documents according to various metrics, or pair-wise measures of relationships between entities, topics, terms, or sentiments discussed in the documents, which may be crafted to yield results like those described above. Through the sophisticated use of computers, inferences that would otherwise be impractical are potentially attainable, even on relatively large collections of documents.

In some cases, a graph may represent relationships between objects indicated in (e.g., named entities mentioned in) a collection of documents (e.g., one or more corpora). Objects may be text or referents of the text, e.g., named entities. The nodes of the graph may represent the objects, and the edges may represent the relationships between objects. The relationships may be determined based on the frequency of terms in text describing the respective objects, where the number of edges linking such graph nodes, the edge weights, and distribution of such edges are based on the frequency of the terms in the plain text. In some cases, variation in text lengths, the use of specific jargon, or other factors can relatively strongly influence the topology of the graph. In some cases, such influence may undermine the explanatory power of the graph by relegating certain objects to a position more marginal than is appropriate because of a poor description, the use of uncommon words in the text describing the respective objects, etc., in the underlying text. As a result, misleading text may negatively affect the representation of the objects in the collection of documents.

SUMMARY

The following is a non-exhaustive listing of some aspects of the present techniques. These and other aspects are described in the following disclosure.

Some aspects include a process including: obtaining a graph comprising nodes and edges, each of the edges linking two of the nodes and having a value indicating an amount of similarity between objects corresponding to the two linked nodes; selecting a parameter for influencing the graph; assessing each of the nodes based on the selected influencing parameter, wherein assessing each of the nodes comprises, with respect to each adjacent node in the graph sharing an edge with the node: determining the value indicating the amount of similarity between the object corresponding to the node and the object corresponding to the adjacent node; and determining a score related to the edge shared with the node, the score determined based on the value indicating the amount of similarity and a value of the selected influencing parameter for the node; and preparing, based on the graph comprising the determined edge scores, instructions to display at least part of the graph.

Some aspects include a process including: obtaining a graph comprising more than 1000 nodes and more than 2000 edges, each of the edges linking two of the nodes and having a value indicating an amount of similarity between objects corresponding to the two linked nodes; selecting a parameter for influencing the graph; for each evaluation node among the nodes of the graph, assessing, by one or more processors, the number of edges of the evaluation node based on the selected influencing parameter, wherein an evaluation node is a node selected to be evaluated, and wherein assessing the number of edges comprises, with respect to each adjacent node in the graph sharing an edge with the evaluation node: determining the value indicating the amount of similarity between the object corresponding to the evaluation node and the object corresponding to the adjacent node; determining a score related to the edge shared with the evaluation node, the score determined based on the value indicating the amount of similarity and a value of the selected influencing parameter for the evaluation node; determining whether the score satisfies a threshold score for maintaining a shared edge; and removing the edge shared with the evaluation node in response to the score not satisfying the threshold score; and preparing, based on the graph resulting from the assessment of the number of edges of the evaluation nodes, instructions to display at least part of the resulting graph.

Some aspects include a process including: selecting a parameter for influencing a graph; determining nodes for the graph and one or more adjacent node candidates for each of the nodes; with respect to each of the nodes and each adjacent node candidate of the node: determining a value indicating an amount of similarity between an object corresponding to the node and an object corresponding to the adjacent node candidate; determining a score related to the adjacent node candidate, the score determined based on the value indicating the amount of similarity and a value of the selected influencing parameter for the node; determining whether the score satisfies a threshold score for maintaining a shared edge; and adding an edge linking the node and the adjacent node candidate based on the score satisfying the threshold score such that the adjacent node candidate is an adjacent node that shares the added edge with the node; and preparing, based on the graph, instructions to display at least part of the graph.

Some aspects include a tangible, non-transitory, machine-readable medium storing instructions that when executed by a data processing apparatus cause the data processing apparatus to perform operations including one or more of the above-mentioned processes.

Some aspects include a system, including: one or more processors; and memory storing instructions that when executed by the processors cause the processors to effectuate operations of one or more of the above-mentioned processes.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
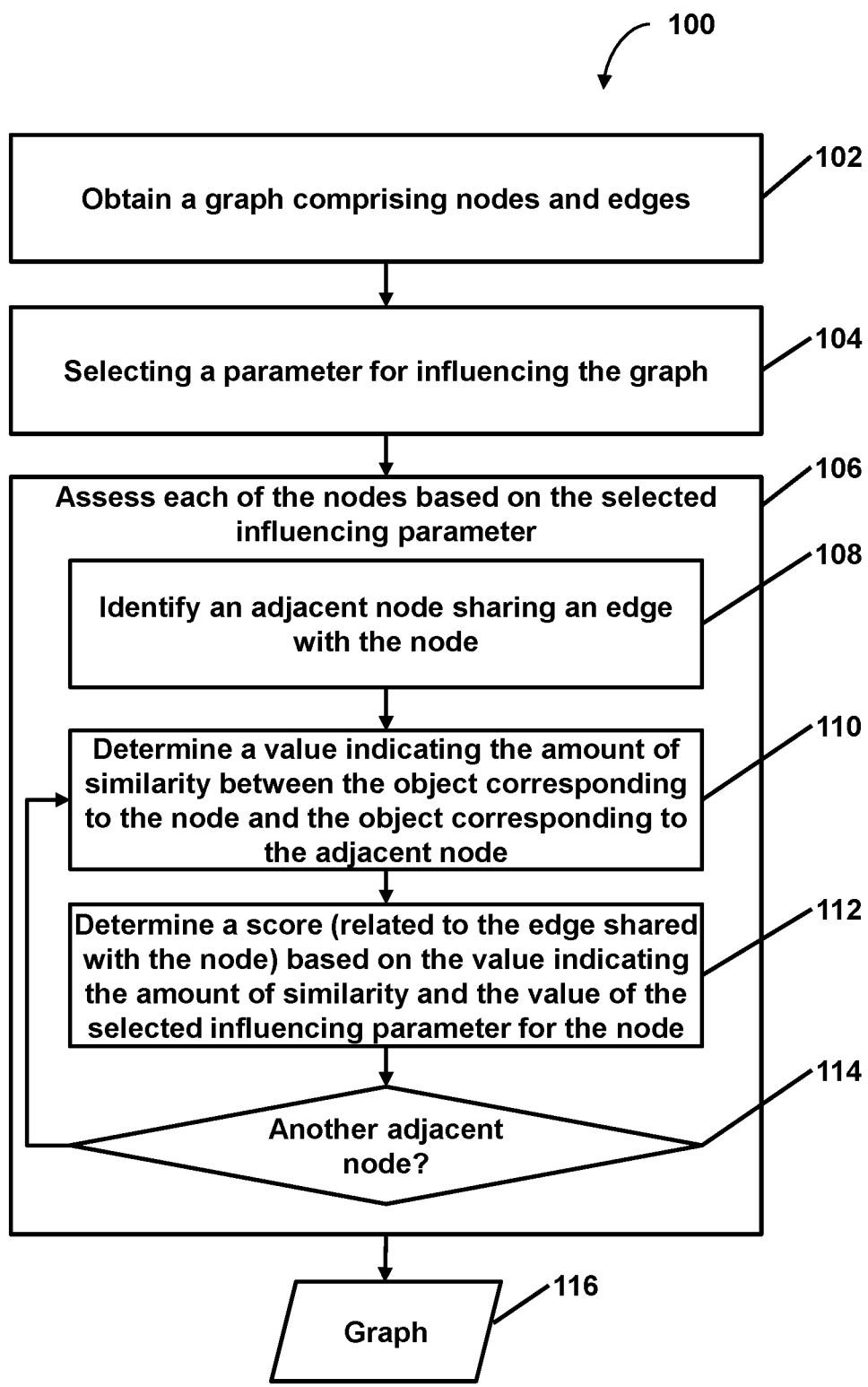
FIGS. 1-3 are flow charts of examples of processes of performing graph generation based on an influencing parameter.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims. As used in the specification and in the claims, the singular form of "a", "an", and "the" include plural referents unless the context clearly dictates otherwise. In addition, as used in the specification and the claims, the term "or" means "and/or" unless the context clearly dictates otherwise.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of natural language processing. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

In some cases, computational linguistic analysis of a collection of documents (or other analyzed corpus) may yield a semantic graph (or other type of graph, like those described below) of objects (e.g., documents, objects indicated in the documents, or other objects), where nodes represent objects and edges (e.g., weighted or unweighted, directed or undirected, etc.) are given by pairwise relationships between each couple of objects. Various computational linguistic techniques (including unsupervised machine learning techniques) may generate this kind of graph, and examples are described below. Typically, in a semantic graph, connections between objects represented by nodes of the graph are drawn based on the frequency of terms in text describing the respective objects, where the number of edges linking such graph nodes, the edge weights, and distribution of such edges are based on the frequency of the terms in the plain text of the corpus. Although, in some cases, the frequency of the terms in plain text (or other term aspects typically utilized) may provide a fair representation of the objects in a corpus, this is not always the case. As an example, variation in text lengths, the use of specific jargon, or other factors can relatively strongly influence the topology of the graph, which may relegate certain objects to a marginal position because of a poor description, the use of uncommon words in the text describing the respective objects, etc. Thus, when such a graph is utilized to perform natural language processing or other computational analysis related to the represented objects, the analysis or the results therefrom may be negatively affected. Negative effects include inefficient use of computational resources (e.g., processing power, memory, etc.), less relevant results, or other drawbacks. Similar issues arise from graphs generated with other techniques, for instance, various machine-learning graph generation algorithms can produce graphs that are similarly misaligned with an analyst's intent To mitigate these problems (or subsets thereof, depending on design tradeoffs), or other problems discussed below, some embodiments generate a graph influenced by one or more selected parameters (e.g., a parameter associated with the nodes of the graph or other parameter) by modifying or supplementing the graph (or a copy thereof to generate a new graph) based on the selected parameters. In some cases, the parameters are exogenous to the text of the documents in the corpus by which the graph was initially formed. As an example, if the number of edges of a node or the cumulative edge weights of the node indicates the degree or position of the node within the graph (e.g., thereby, indicating the degree of relevance or importance of the object represented by the node relative to one or more other objects represented by other nodes in the graph), the selected parameters may be utilized to influence the number of edges or the cumulative edge weights of respective nodes or other aspects of the graph. As a result, for example, nodes performing particularly well in a certain feature (represented by a selected parameter) may be associated with a higher degree or placed in a more central position in the graph, while underperforming nodes may be associated with a lower degree or placed in a more peripheral location in the graph. This may, for example, relax the dependency toward a particular choice of text describing respective objects represented in the graph, provide a more fulfilling picture of a certain feature under observation, etc., which may allow for more efficient computation analyses and/or improved results therefrom. In one scenario, with respect to a graph where each node represents a piece of news, it may be desirable to increase the connectivity of nodes with higher social sharing (e.g., because those are the ones around which the discussion is more likely developed) and/or to reduce the connectively of nodes representing articles of barely-followed blogs. In some embodiments, multiple influencing parameters may respectively be used to generate multiple graphs (from a base graph, the base graph being generated based on unstructured endogenous natural language text of the documents) that are targeted for specific computational analyses.

Figure 2:
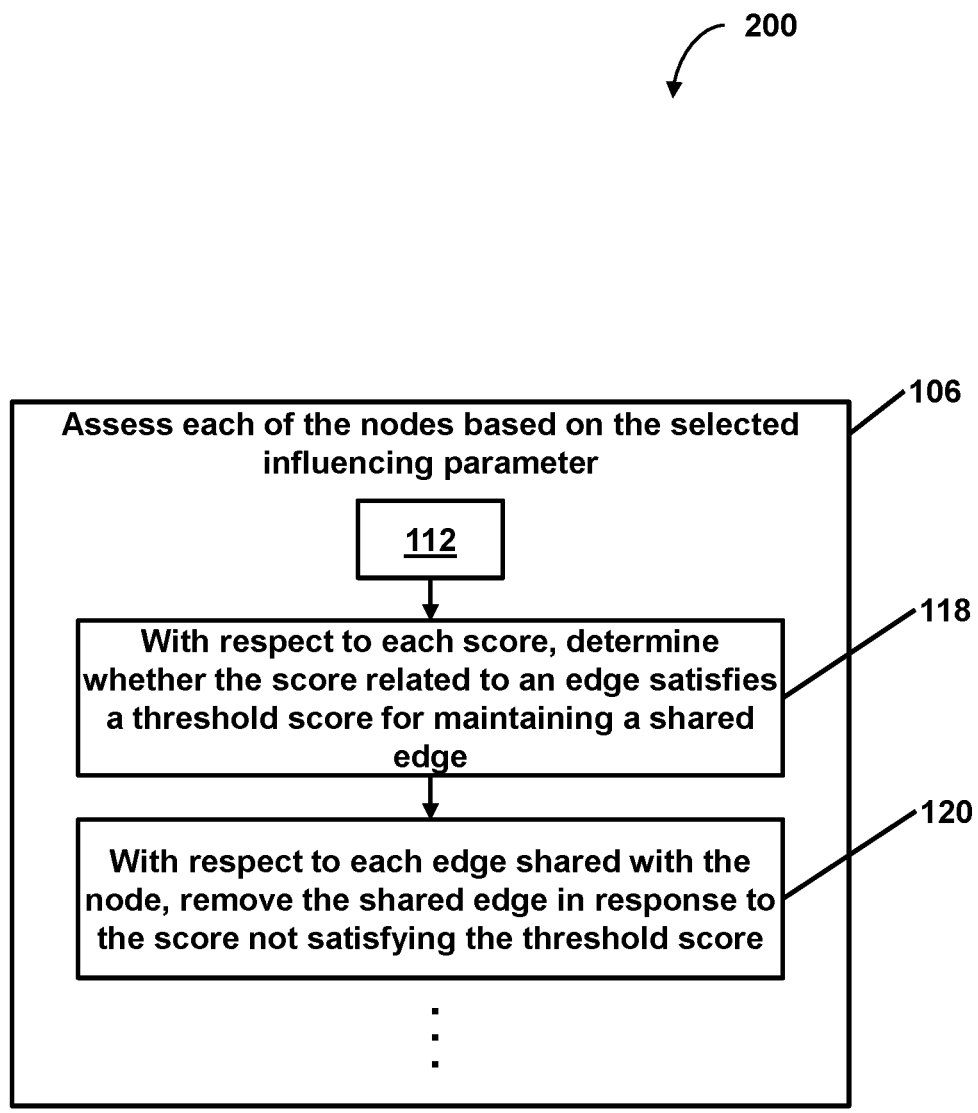
Figure 3:
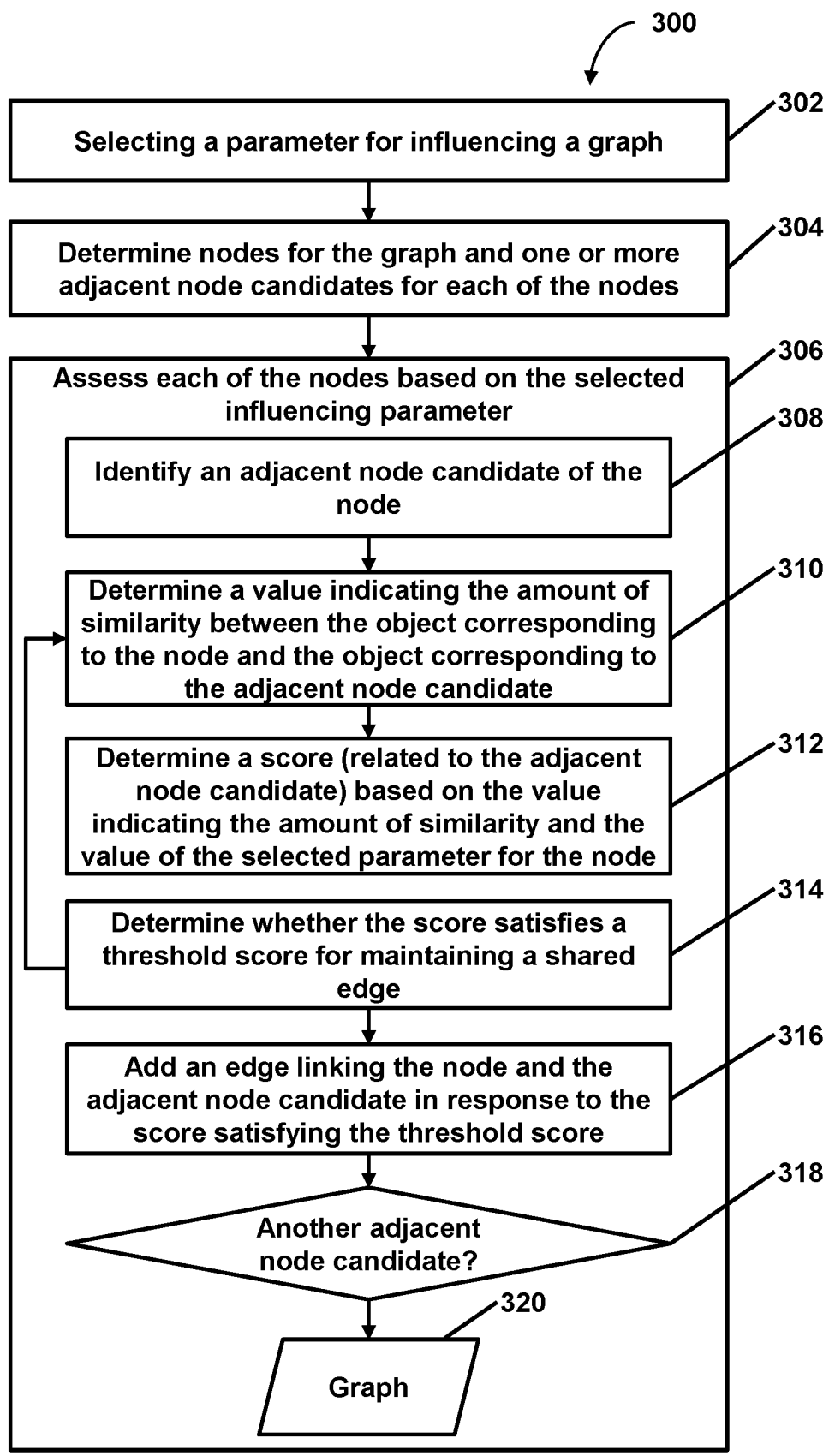

FIGS. 1-3 illustrate examples of processes 100, 200, and 300 configured to perform graph generation based on an influencing parameter, including modification of a graph using the influencing parameter, creation of one or more graphs using the influencing parameter, etc. The steps of the processes 100, 200, and 300 presented below, like the other examples herein, are intended to be illustrative. In some embodiments, the processes of 100, 200, or 300 may be accomplished with one or more additional steps not described, and/or without one or more of the steps discussed. Additionally, the order in which the steps of the processes 100, 200, or 300 are illustrated in FIGS. 1, 2, and 3, respectively, and described below is not intended to be limiting. Neither of which is to suggest that any other embodiment is so limited.

In many likely commercially relevant use cases, the processes 100, 200, or 300 may tax the limits of the computational resources available. The process of generating a graph based on an influencing parameter, and other use cases, is often constrained by time and computing resources available. For example, some embodiments may perform the analyses described herein within less than 24 hours, for example, within less than five hours, like within less than one hour, and in some cases in real-time (e.g., within less than 30 seconds following a user request, and in some cases, within well less than 5 seconds) using, for example, less than 1 Tflops (or floating point operations per second), 500 Gflops, or 100 Gflops of computing power to service the requested analysis. In some cases, a single computing device (or virtual machine having a distinct operating system instance or a container instance) may implement the processes 100, 200, or 300, or some embodiments may be implemented in a distributed fashion, with a plurality of computing systems operating in a networked environment, like a data center. Examples of such computing systems are described below with reference to FIG. 5.

In some embodiments, the processes 100, 200, or 300 include obtaining data upon which the processes 100, 200, or 300 operate, e.g., a graph, or corpora from which a graph is formed. In some cases, the processes 100, 200, or 300 take as an input a graph in the form of a list of edges, adjacency matrix, or other format. Some embodiments may also ingest the content of each document as plain text, or other forms of input may be obtained as described below, e.g., with reference to FIG. 4. To perform text quantitative analysis, some embodiments may covert such text into text vector representations (like feature vectors), e.g., rows or columns in a term-document matrix where each row or column corresponds to a different document. Similarly, the graph structure may be converted into a matrix to expedite computing operations and conserve memory relative to other data structures, like key-value pairs (though embodiments are also consistent with the use of key-value pairs, e.g., with document identifiers serving as keys to lists of document terms).

In some embodiments, data obtained via the processes 100, 200, or 300 may include data from an internal dataset, where the internal data set may be an analyzed corpus of documents (or other objects) having semantic (or other) interrelationships reflected in a graph taken as input for the processes 100, 200, or 300. Data obtained via the processes 100, 200, or 300 may additionally or alternatively include data from an external dataset, where the external dataset may include a different corpus of documents (or other data sources described below) that have information about things that both are discussed in the internal dataset and give rise at least in part to the graph (taken as input for the processes 100, 200, or 300). Thus, the external dataset may include content that was not considered when constructing the graph. The external dataset, in some embodiments, may provide an independent source of information for evaluating the quality of the graph. The external dataset may be a different source of information from that considered when constructing the graph. For example, the external dataset may be structured or unstructured data. In some cases, the external dataset is a different instance of the above-described examples of corpora for the internal dataset, e.g., the internal dataset may be based on academic articles and the external dataset may be based on a body of journalism. In some cases, the external dataset may be retrieved from a different source or repository relative to the internal dataset, e.g., based on documents with different authors and published by different entities.

In some embodiments, the external dataset may be indexed to facilitate selection of documents, or the external dataset may be the result of selection, e.g., querying based on text of nodes graph 16. In some cases, the external dataset includes data relevant to the graph topology 16 obtained with reference to an index. Examples include results from search engines and online encyclopedias, like Wikipedia™. In some cases, the external dataset may be obtained by searching the index for certain terms, like entity names or other keywords, and retrieving responsive documents. In some embodiments, the external dataset may be expanded to include other documents referenced by, for example hyperlinked to, documents within an external dataset, for example, online encyclopedia webpages linked to by a given online encyclopedia page. In some cases, this technique for expanding the external dataset may be repeated for some or all of the retrieved documents by following links. In other examples, the external dataset may be obtained by curation, for example, by a human analyst compiling a collection of documents known to be relevant to relationships revealed within the graph.

In some embodiments, the internal dataset or external dataset may be a corpus of documents that have undergone some processing, for example, feature extraction and compression to conserve memory and expedite processing. For example, in some cases, stop words or terms satisfying a threshold for term frequency inverse document frequency (TF-IDF) scoring may be filtered from the documents, removing those terms, and leaving the documents shorter. TF-IDF includes variants thereof, like BM25, wherein the effect of term frequency is dampened. In another example, documents may be excerpted, for example, excluding all but the first and last paragraph of the document, or first and last paragraphs following a heading, as indicated by a markup language of the document. In some embodiments, documents may be excerpted by crawling a document object model and extracting unstructured text based on the location and context of the unstructured text within the document object model, for example, text within a bracketed set of tags indicating a title or body of an article.

In other examples, the external dataset may be or include structured data, for example, data in a relational database having a plurality of fields of information about given key values, like business names, product names, entity names, and the like, and the external dataset 14 may be a collection of responses to queries corresponding to the key values. In another example, the external dataset may be triples in a resource description framework (RDF) format, for instance, or responses to queries to a knowledge graph, with query values or key values corresponding to things discussed within the internal dataset, for example, extracted entities, sentiments, topics, or combinations thereof. Other examples include data arranged in hierarchical serialized data formats, like XML or JSON.

In some cases, the external dataset may be obtained by querying a larger data collection (e.g., unstructured text documents or relational databases, or the like) with query terms obtained from the internal dataset. For example, such query terms may be obtained by extracting entities mentioned in unstructured text of the internal dataset. Examples of techniques for extracting entities include techniques for named-entity extraction provided by the set of modules titled "A Nearly-New Information Extraction System" (ANNIE) in the General Architecture for Text Engineering (GATE) system published by the University of Sheffield, or the Named Entity Recognition feature of the Natural-Language Toolkit published by Team NLTK and available from nitk.org. In some cases, entities are extracted by parsing unstructured text, analyzing the first character of each term to determine whether the term is capitalized, and then determining whether proceeding terms are followed by a period to determine whether the term is likely a proper noun. Sequences of capitalized terms may also be detected and determined to constitute an entity name corresponding to a proper noun. In some embodiments, a collection of candidate proper nouns may be extracted, and those proper nouns having greater than a threshold TF-IDF score for the respective document may be designated as entities discuss within the document and used individually or in combination as query terms to retrieve or label the external dataset. Or some embodiments may receive manually entered inputs from humans, for instance, crowd-sourced external datasets.

In some embodiments, the external dataset may include a plurality of subsets of documents, for example, one subset for each query by which documents or other data is retrieved, and the respective subsets may be associated in memory with the query or the document upon which the query is based within the internal dataset. Thus, in some embodiments, each document in internal dataset may be associated with a different set of information in the external dataset (which is not to imply that such information may not be overlapping between different documents in the internal dataset or that every set of information in the external dataset made must be different for the different respective documents in the internal dataset). In some cases, when evaluating the quality of a connection between documents in the internal dataset indicated by the graph (taken as input for the processes 100, 200, or 300), the corresponding subsets of information from the external dataset may be retrieved and serve as the external dataset for purposes of subsequent steps. This correspondence may be determined before subsequent processes (e.g., by extracting entities and searching for every document in an analyzed corpus) or after subsequent processes in different embodiments (e.g., by searching within an external dataset based on the below-described adjacent nodes identified during evaluation of graph quality after nodes are identified as adjacent).

In some embodiments, the graph (taken as input for the processes 100, 200, or 300) may be a data structure in memory that indicates semantic relationships between documents in the internal dataset, which may be some or all of an analyzed corpus of documents. In some cases, the graph is a weighted graph having nodes corresponding to respective documents in the corpus and edges having weights indicating semantic similarity between pairs of nodes to which those edges connect (that is, semantic similarity between unstructured text in documents corresponding to those nodes, e.g., semantic similarity in the sense of distributional semantic similarity where bodies of text with similar distributions of terms are deemed to have similar meanings).

In some embodiments, the graph (taken as input for the processors 100, 200, or 300) may be arranged as a matrix. In some cases, each row and column of the matrix may correspond to one of the documents in a corpus, with each document having one row and one column of the matrix. Values within the matrix may indicate the semantic similarity between the document of the respective row and the respective column. Documents along a diagonal may have a zero value (or other designated value, like null), as the same document may match on the row and column, and it may be useful to distinguish those identity relationships from other non-identity semantic similarity values to avoid distorting measures of similarity. Thus, in some embodiments, the graph may be arranged as a square symmetric matrix. As the data structure indicates, adding additional documents to the corpus can dramatically expand the computational and memory intensity of a given analysis, as each added document potentially gives rise to pairwise relationships with every extant document in the matrix. Accordingly, for larger collections of documents, some embodiments may execute techniques described below for accelerating linear algebra operations in ways that account for the memory hierarchy of computer systems and compressing matrices in memory, particularly sparse matrices. The graph may be obtained with a variety of techniques, including using tools provided by Quid, Inc. of San Francisco, Calif., and the techniques described below. In other embodiments, the graph may represent relationships between things other than documents, e.g., other units of language (like corpa, paragraphs, or sentences), sentiments, terms, or entities (like businesses, products, places, or people).

In some embodiments, the graph (taken as input for the processes 100, 200, or 300) may be pruned to create an adjacency matrix. In some cases, computer processes may run faster and consume less memory, particularly for large datasets, as a result of such pruning, as unprogrammed applications may tend to scale poorly in terms of memory complexity and processing complexity. (That said, some embodiments may not prune and may have sufficient computational resources, which is not to suggest that any other step or process were feature described herein may not also be omitted in some embodiments.) In some cases, this step may include comparing each weighted edge to an adjacency threshold and removing those edges that fail to satisfy the threshold, e.g. have less than a threshold amount of semantic similarity. In some cases, removal of an edge may include designating the edge as removed (e.g., by setting its weight or other value to indicate the removal). In some cases, the resulting adjacency matrix (e.g., another square symmetric matrix with zeros along a diagonal, like that described above) may have fewer nonzero weighted edges between pairs of documents. In some cases, the adjacency matrix may constitute a sparse matrix amenable to techniques described below to conserve memory and expedite processing. Or in some embodiments, the adjacency matrix may remain a dense matrix.

In some embodiments, the graph (taken as input for the processes 100, 200, or 300) be represented by a feature set matrix. In some cases, the feature set matrix may be a term document matrix of the corpus of the internal dataset (e.g., by which the graph is created). In some embodiments, the term document matrix may include a plurality of vectors, each vector corresponding to a respective document within the corpus, and values within the vector corresponding to the presence, number, or frequency of occurrences of n-grams within the respective document. In some cases, these vectors may be appended to one another to constitute the feature set matrix, for example, rows of the matrix may correspond to documents, and columns to n-grams, or vice versa. In some cases, the vectors may be appended to one another in the same order as documents are listed across rows or columns in the adjacency matrix to facilitate linear algebra operations and conserve memory over systems that label these values independent of sequence.

In some cases, the feature set matrix may be created by parsing unstructured text of the internal dataset, for example, initially on a word-by-word basis, and updating a document vector as each word is encountered, for example, by incrementing a count for a value of the vector corresponding to the encountered word after the word is encountered. In some cases, to expedite access, the values of the vector may be sequenced in a particular fashion, for example alphabetically, to facilitate a binary search, or according to a hash table, e.g., with some amount of collisions being tolerated. Further, the same document may be parsed on a pair-of-terms basis, with a similar updating routine to update values corresponding to n-grams having an in value of two, and then a similar process may be performed on a sequence of three terms basis. In some embodiments, such parsing may be done in parallel, e.g., with a MapReduce implementation, to expedite processing, with different portions of the vector assigned to different threads or computing devices, that then return a subset of the vector that is appended to the other subsets. In some cases, counts may be divided by a count of terms in a document to determine a frequency. In some cases, alternatively or additionally, a co-occurrence matrix may be determined with similar techniques, e.g., when analyzing similarity relatedness of entities or terms in documents.

In some cases, some terms may be disregarded as having low information value. In some embodiments, a list of stop words may be maintained and compared against parsed values to determine whether to disregard the parsed term, e.g., upon determining the parsed word is a stop word. Examples of stop words include terms like "the," "and," "a," and other relatively common terms.

Some embodiments may use more sophisticated techniques to determine which terms to disregard or down weight. Examples include term frequency inverse document frequency analysis. Some embodiments may, either based on a sample or analysis of an entire corpus, determine a term frequency-inverse document frequency of n-grams and disregard n-grams failing to satisfy a threshold score, indicating the terms are relatively frequent and about as frequent within a given document as they are within a larger corpus. This is expected to increase the sparseness of the feature set matrix, which may enhance the effect of various techniques described below for expediting operations on and reducing the memory consumed by sparse matrices. In some embodiments, the size of n-grams may range from an n-gram of a single term up to an n-gram of a plurality of terms, for example, more than or equal to three terms, five terms, or seven terms, depending upon available computing resources and diversity of language in use. As a result, in some embodiments, the corresponding term document matrix may be relatively large, as there are a relatively large number of different terms and sequences of terms that may occur within a given corpus. Another attribute of this matrix is that in some cases, many of the values may be zero, as many of the terms occurring in other documents will not occur within a given document, giving rise to the sparse matrix designation.

As shown in FIG. 1, some embodiments may obtain a graph comprising nodes and edges, as indicated in step 102. Each of the nodes may represent named entities mentioned in a corpus of documents or the documents themselves (e.g., portions thereof). Each of the edges may link two of the nodes. Each of the edges may have a value indicating an amount of similarity (or other relationship) between objects corresponding to the two linked nodes. This indicated value may, for example, be designated as the weight of the respective edge. In some cases, depending on the type of relationship, the edges may be directed (e.g., in a species-genus graph), or the edges may be undirected (e.g., in some types of similarity graphs). In some embodiments, the graph may include more than 1000 nodes and more than 2000 edges, more than 10000 nodes and more than 20000 edges, more than 100000 nodes and more than 200000 edges, or other number of nodes and edges. In some embodiments, the nodes of the graph may represent the objects (e.g., documents, sentiments, terms, or entities, etc.), where the graph may, for example, represent relationships therebetween (e.g., species-genus, semantic similarity, semantic differential, etc.). In some embodiments, the edges may be trimmed to remove those below a threshold, or some embodiments may obtain a fully connected graph, before trimming, to permit biasing of all of the trimming determinations. In some cases, the graph is obtained concurrently with subsequently described steps, e.g., the graph described below as being transformed, in some cases, may be a graph being initially formed, and the techniques below may affect the initial graph formation.

In some embodiments, a parameter for influencing the graph may be selected, as indicated in step 104, and nodes of the graph may be assessed based on the selected influencing parameter, as indicated in step 106. The parameter may be selected with a technique different from the technique by which the graph was formed, e.g., in a bag-of-words model, the words in the document would not constitute a parameter for this purpose. In some cases, the parameter is selected based on a type of parameter chosen by a user. For instance, the user may choose a particular type of parameter, and parameters may be selected by querying a database for instances of the parameter that correspond with specific nodes being processed.

Some embodiments may select the parameter based on the documents. In some cases, the parameter is a metadata parameter of documents constituting or mentioning the objects, e.g., a measure of virality or shares, a click-through rate, a click-through and dwell time, a search-engine ranking of the document in response to a particular set of keywords, a count of a number of times other documents link to the document, or a combined measure, e.g., a weighted count of links, where the weight is based on an amount of times the linking documents were shared (or any of the other parameters above as applied to the linking documents).

Some embodiments may select the parameter based on attributes of named entities corresponding to the nodes, and in some cases, the attributes are based on information external to the corpus from which the graph was formed. For instance, for business entities, the parameter may be values extracted from the Securities and Exchange Commission's EDGAR database, like annual revenue, employee count, profit, capitalization, loss, keywords in particular sections, etc., or the parameter may be taken from a website of the business, like a search engine ranking of the business's website in response to a particular keyword. In some cases, for business entities, the parameter may be a parameter specific to the type of business, e.g., for restaurants, the parameter may be a rating of the restaurant by a reviewer or an attribute of the restaurant in a taxonomy of restaurants. In some cases, the parameter is an attribute of a person, like age, citation count for an author, position, ranking, etc. In some cases, the parameter is an attribute of a place, like visitation rates for a particular demographic, or rainfall amounts during winter months.

In some cases, the assessment of a node may include mapping the value of the selected influencing parameter for the node to a logistic function to affect the degree or position of the node within the graph. As an example, a linear function may make the degree or position of the node within the graph more proportional to the value of the selected influencing parameter for the node, while a higher-order, non-linear polynomial function (or other non-linear function, like a sigmoid function) may cause an in-between behavior in the degree or position of the node within the graph.

For example, some embodiments may adjust the edges connecting to a given node based on an amount of times that a document corresponding to the node was shared in a social network. For instance, some embodiments may retrieve a row or column of an adjacency matrix from memory, corresponding to relationships between the given node and other nodes, from memory, to form an adjacency vector. Some embodiments may calculate a fitness parameter value, e.g., based on the amount of shares of the given document or the other examples described herein. Then, some embodiments may adjust each value in the adjacency vector based on the fitness parameter. In some embodiments, fitness parameters may be normalized among a group of the nodes, e.g., all of the nodes, prior to the adjustment to manage scaling. In some embodiments, normalization may occur after adjusting the edge weights, for instance along a row or column of the adjacency matrix. Or, in some cases, transformed edge weights may be normalized according to one or more of these strategies.

In some cases, each edge weight of the vector may be multiplied by a (e.g., normalized) fitness parameter value. For instance, if document A shares edge weights of 0.2, 0.3, and 0.1 with documents B, C, and D, and the fitness parameter is determined to be 2, each of these values may be doubled to 0.4, 0.6, and 0.2. In some cases, the adjustment may be made by multiplying the edges by the fitness parameter, dividing the edges by the fitness parameter, or thresholding the edges (e.g., during pruning) by adjusting the threshold according to the fitness parameter. In some embodiments, the edge weight may be adjusted according to a polynomial function of one or more fitness parameters. In some cases, a continuous function and a discontinuous function may be combined to adjust the edge weights, e.g., within the range of 0 to 1, the fitness parameter may result in an edge weight of 0, within the range of 1 to 9, the fitness parameter may result in an edge weight that is proportional to the existing edge weight, and from 9 to 10, the fitness parameter may cause the edge weight to be set to 2. In some cases, edges may be increased in weight, decreased in weight, changed to survive pruning, changed to be removed in pruning, or any permutation thereof.

In some cases, multiple fitness parameters may be applied. For example, one fitness parameter may be input to a discontinuous function that outputs a multiplier of 0 or 1 over respective ranges of fitness parameter values, and another fitness parameter may be multiplied by this output, e.g., to scale those edge weights having a value of 1 for the first fitness parameter, proportionate to the value of the second fitness parameter. Or some embodiments may adjust edge weights according to one fitness parameter and adjust threshold values for pruning according to another. Or, in some cases, the transformed edge weight may be a polynomial function of the two (or more) fitness parameters.

In some embodiments, a user interface may present a set of values for a user to select among and slider bars by which a user selects the magnitude of the effect by the respective value on a fitness parameter. Some embodiments may receive these selections and scaling values and fitness parameters maybe determined responsive to the selections, e.g., a user may select social shares, author age, and geographic distance of author to New York city as values, and scale the effect of these values with on-screen slider bars, for instance setting social shares to be ¼ as effective as author age, and author age to be twice as effective as geographic distance.

In some embodiments, the edges may be adjusted according to values associated with first, second, or higher degree connections to the given node in the graph (e.g., before or after pruning). For instance, values for the given node by which fitness parameters are calculated may be a measure of central tendency (e.g., mean, mode, median) of the values associate with that node, each node adjacent to the given node, and each node adjacent those nodes. In some cases, the measure of central tendency may be a weighted combination, such that contributions are diminished for nodes that are further away. Or in some cases, such values may be averaged for the nodes on either side of an edge to determine the fitness parameter for that edge.

The transformed vector may be inserted back into the matrix, and the operation may be repeated for each vector in the adjacency matrix. In some cases, multiple vectors may be operated upon concurrently, e.g., in different threads or on different computing devices, e.g., on different nodes within a MapReduce-based framework, like Apache Hadoop™, or within Apache Spark™.

In some embodiments, edges may be adjusted based on a function that changes over several iterations to generate an animated view of a graph transitioning from pre-adjustment to post adjustment. For example, some embodiments may pre-calculate several (e.g., more than 5) adjacency matrices corresponding to a single transformation, changing the function by which the fitness parameter affects the matrix through some range by a step in each iteration. For instance, edges may be scaled by some co-efficient that increments from 0 to 10 by steps of 2 to form five versions of a transformed adjacency matrix. In some cases, the step value may vary through the range, e.g., increasing through the start of the range and decreasing toward the end of the range, to cause the animated transformation to appear to accelerate and settle into the new structure. In many cases, determining the matrices may be too computationally taxing to animate a transition in real-time, so some embodiments may pre-calculate the matrices to construct the animations.

Some embodiments may generate a biased graph based on the parameter to drive the attention of an observer toward nodes that are more relevant to one or more features of interest (e.g., a feature of interest associated with the selected parameter). In some embodiments, nodes having a greater degree (or number of adjacent edges) may be more prominently displayed (e.g., with greater visual weight and central positioning, like in a force directed layout). To adjust the degree of each node, some embodiments may prune a fully connected (e.g., a substantially fully connected and unpruned) graph yielded from distributional semantic analysis of a corpus of documents based on the parameter. For instance, the value of the parameter for a given node, or pair of nodes, may affect the determination of whether to prune an edge there between. Or some embodiments may otherwise adjust the graph, e.g., by mapping properties of the parameter to the nodes or edge weights and adjusting the display accordingly, e.g., changing the visual weight of a node based on the parameter or a physics model based on the parameter.

As an example, to analyze how startups are shaping the market in a specific field, a graph may be obtained where each node of the graph represents a company and edges connect the nodes with weights indicative of similarity. To highlight startups, a combination of age and capital of the companies may be selected as a parameter (or parameters) to influence the graph (e.g., with a bias toward younger companies with more limited capital), in accordance with the techniques described herein. Some embodiments may adjust edge weights of the graph based on the parameters (e.g., multiplying by capital and dividing by age) and, then, prune those edges having less than a threshold adjusted weight. In this way, for example, the resulting graph may better targeted for the desired investigation into how startups are shaping the market by providing a more-focused view of the startups, while still taking into account the presence of older companies in the background. Other examples, including embodiments involving investigations into other aspects, are contemplated.

In some embodiments, the assessment of the nodes of the graph may include one or more of steps 108-114. As indicated in steps 108 and 110, with respect to each of the nodes, an adjacent node sharing an edge with the node may be identified, and a value indicating the amount of similarity between the object corresponding to the node and the object corresponding to the adjacent node may be determined. In some cases, the indicated value is the current weight assigned to the edge linking the node and the adjacent node (e.g., where an edge weight indicates semantic similarity between pairs of nodes to which those edges connect). In some cases, the indicated value is a value separate and/or independent from the current weight assigned to the edge.

As indicated in step 112, a score (related to the edge shared with the node) may be determined based on the value indicating the amount of similarity (between the object corresponding to the node and the object corresponding to the adjacent node) and the value of the selected influencing parameter for the node. In one scenario, edge weights are represented as numbers from 0 to 1, where an edge having a weight of 0 indicates a lack of similarity between the two nodes (or between their respective corresponding objects) that the edge connects, and an edge having a weight of 1 indicates a very high amount of similarity between the two nodes (or between their respective corresponding objects) that the edge connects. If, for example, the value indicating the amount of similarity reflects the weight of the edge shared between the node and the adjacent node, the value of the selected influencing parameter for the node may be translated into a number from 0 to 1, and the value indicating the amount of similarity may be multiplied by the translated value of the selected influencing parameter for the node to determine the score related to the shared edge. In some cases, the score is based on parameters for each node of the edge, e.g., an average. In some embodiments, each edge connected to a node is processed before advancing to the next node.

If, in step 114, another adjacent node (sharing an edge with the node) is identified, steps 110 and 112 may be repeated with respect to the additional adjacent node. As an example, a value indicating the amount of similarity between the object corresponding to the node and the object corresponding to the additional adjacent node may be determined, and a score (related to the edge shared with the node) may be determined based on the value indicating the amount of similarity (between the object corresponding to the node and the object corresponding to the additional adjacent node) and the value of the selected influencing parameter for the node. In some embodiments, steps 108-114 may be repeated for each of the nodes of the graph to be assessed, and, as shown in FIG. 1, a resulting graph 116 may be generated. This process, in some cases, may be executed concurrently by multiple computing devices, e.g., with each having a copy of the input graph in local memory, to expedite operations.

In some embodiments, the input graph may be represented by an adjacency matrix, and the adjacency matrix may be multiplied by a matrix comprising the values of the selected parameters for the nodes of the input graph. As noted above, these matrices may be relatively large as compared to the available computing resources and time available. In some use cases, these challenges may be mitigated by using some of the below-described techniques for expediting matrix operations. Or, for simple use cases, a more naive approach may be used, by which, for a given row, each column is iteratively retrieved from a lower level of a memory hierarchy (e.g., storage, random-access memory, L3 cache, and L2 cache, up to processor registers), multiplied by corresponding values of the given row and then summed, with the resulting value written into the corresponding row and column position of matrix 38. In this example, each column may be moved up the memory hierarchy to the processor multiple times, for example, at least once for each row, and in some cases multiple times for each row. For larger analyses, though, these operations may impose substantial delays in the aggregate, as the time taken to move data, for example, from storage to a central processing unit (CPU) register, or even from dynamic random access memory (DRAM) to a CPU register, can be several orders of magnitude longer than the time taken to access a given value in a CPU register, or even a higher level of cache memory on the CPU. That said, some embodiments may use this simpler approach to conserve developer time where the scale of the datasets and available computing hardware permit such implementations.

In some embodiments, if (e.g., in response to determining that) a score (e.g., related to a shared edge) is determined to not satisfy a threshold score for maintaining a shared edge, the edge may be removed. In some cases, removal of an edge may include designating the edge as removed (e.g., by setting its weight or other value to indicate the removal). As shown in FIG. 2, the process 200 may include steps related to the assessment of the nodes of the input graph. In some embodiments, as indicated in step 118 of FIG. 2, after a score (related to an edge linking a node and an adjacent node) is determined (e.g., based on the value indicating the amount of similarity between the corresponding objects and the value of the selected influencing parameter for the node), a determination of whether the score satisfies a threshold score for maintaining a shared edge may be effectuated. As indicated in step 120, the shared edge may be removed in response to the score not satisfying the threshold score. Alternatively, the shared edge may be maintained or created in response to the score satisfying the threshold score. In some cases, the determination with respect to satisfaction of the threshold score and the removal of edges may be performed after a portion of the respective scores for the edges of the nodes to be assessed are determined. In some cases, the determination and the removal steps may be performed after all the respective scores for the edges of the nodes to be assessed are determined. In some embodiments, the input graph may be pruned in the foregoing manner to create an adjacency matrix representing the resulting graph 116. As indicated, in some cases, this may allow computer processes with respect to the resulting graph 116 to run faster and consume less memory, particularly for large datasets, as a result of such pruning, as unprogrammed applications may tend to scale poorly in terms of memory complexity and processing complexity.

Some embodiments may utilize the resulting graph to present a data visualization of the objects (corresponding to the graph nodes) that is more focused on one or more features associated with the selected influencing parameter (e.g., data visualization that highlights objects with a higher correlation to the focused features). In some embodiments, one or more search queries may be performed on the resulting graph to derive results that are more relevant to the features associated with the selected influencing parameter and/or in a more efficient manner than an uninfluenced graph. Some embodiments may select among isomorphic representations of the biased, trimmed graph based on the parameter-adjusted edge weights, e.g., by calculating an energy of nodes in various candidate isomorphic representations with a physics model based on the adjusted weights and selecting a candidate with the lowest energy.

As shown in FIG. 3, some embodiments add one or more edges to a graph (or to construct a graph) to link nodes and their respective adjacency node candidates based on an influencing parameter. In some embodiments, a parameter for influencing the graph may be selected, as indicated in step 302, and nodes for the graph and one or more adjacent nodes candidates for each of the nodes may be determined, as indicated in step 304. As indicated in step 306, the determined nodes may be assessed based on the selected influencing parameter. As discussed, in some cases, the assessment of a node may include mapping the value of the selected influencing parameter for the node to logistic function to affect the degree or position of the node within the graph.

In some embodiments, the assessment of the nodes of the graph may include one or more of steps 308-318. As indicated in steps 308 and 310, with respect to each of the determined nodes, an adjacent node candidate of the node may be identified, and a value indicating the amount of similarity between the object corresponding to the node and the object corresponding to the adjacent node candidate may be determined. As indicated in step 312, a score (related to the adjacent node candidate) may be determined based on the value indicating the amount of similarity (between the object corresponding to the node and the object corresponding to the adjacent node candidate) and the value of the selected influencing parameter for the node.

In some embodiments, if (e.g., in response to determining that) a score (e.g., related to the node and the adjacent node candidate) is determined to satisfy a threshold score for maintaining a shared edge, an edge may be added to link the node and the adjacent node candidate such that the adjacent node candidate becomes an adjacent node that shares the added edge with the node. In some embodiments, as indicated in step 314, after the score (related to the node and/or the adjacent node candidate) is determined, a determination of whether the score satisfies a threshold score for maintaining a shared edge may be effectuated. As indicated in step 316, an edge may be added in response to the score satisfying the threshold score. Alternatively, an edge may not be added in response to the score not satisfying the threshold score (e.g., such that the adjacent node candidate does not become an adjacent node of the node in the graph).

If, in step 318, another adjacent node candidate of the node is identified, steps 310-316 may be repeated with respect to the additional adjacent node. As an example, a value indicating the amount of similarity between the object corresponding to the node and the object corresponding to the additional adjacent node may be determined, and a score (related to the node and/or the additional adjacent node candidate) may be determined based on the value indicating the amount of similarity (between the object corresponding to the node and the object corresponding to the additional adjacent node candidate) and the value of the selected influencing parameter for the node. In some embodiments, steps 308-318 may be repeated for each of the nodes of the graph to be assessed, and, as shown in FIG. 3, a resulting graph 320 may be generated. This process, in some cases, may be executed concurrently by multiple computing devices, e.g., with each having a copy of the input graph in local memory, to expedite operations. In some cases, the determination with respect to satisfaction of the threshold score and the addition of edges may be performed after a portion of the respective scores (related to the nodes and/or the adjacent node candidates) are determined. In some cases, the determination and the removal steps may be performed after all the respective scores are determined.

In some embodiments, at least a subset of the steps of the processes 100, 200, and 300 may be performed to generate a resulting graph. As an example, a graph may be obtained, and a parameter for influencing the graph may be selected. The graph may be pruned in accordance with step 106 (e.g., comprising at least a subset of the steps 108-114 and 118-120). Additionally, or alternatively, the graph may be supplemented in accordance with step 306 (e.g., comprising at least a subset of the steps 308-318). In this way, the pruning and/or supplementation of the graph may generate the resulting graph, e.g., that is influenced by the selected parameter.

In some embodiments, the processes 100, 200, or 300 may be performed within a single instance of one of the computing systems described below with reference to FIG. 5, or some embodiments may distribute some portions of the operations amenable to parallelization across multiple computing systems. Certain matrix operations, however, are not expected to be amenable to such distributed processing when accounting for delays due to network exchanges across a local area network. In some embodiments, the processes 100, 200, or 300 may be performed with entire matrices held in program state, for example at a DRAM level or higher level of a memory hierarchy.

Figure 4:
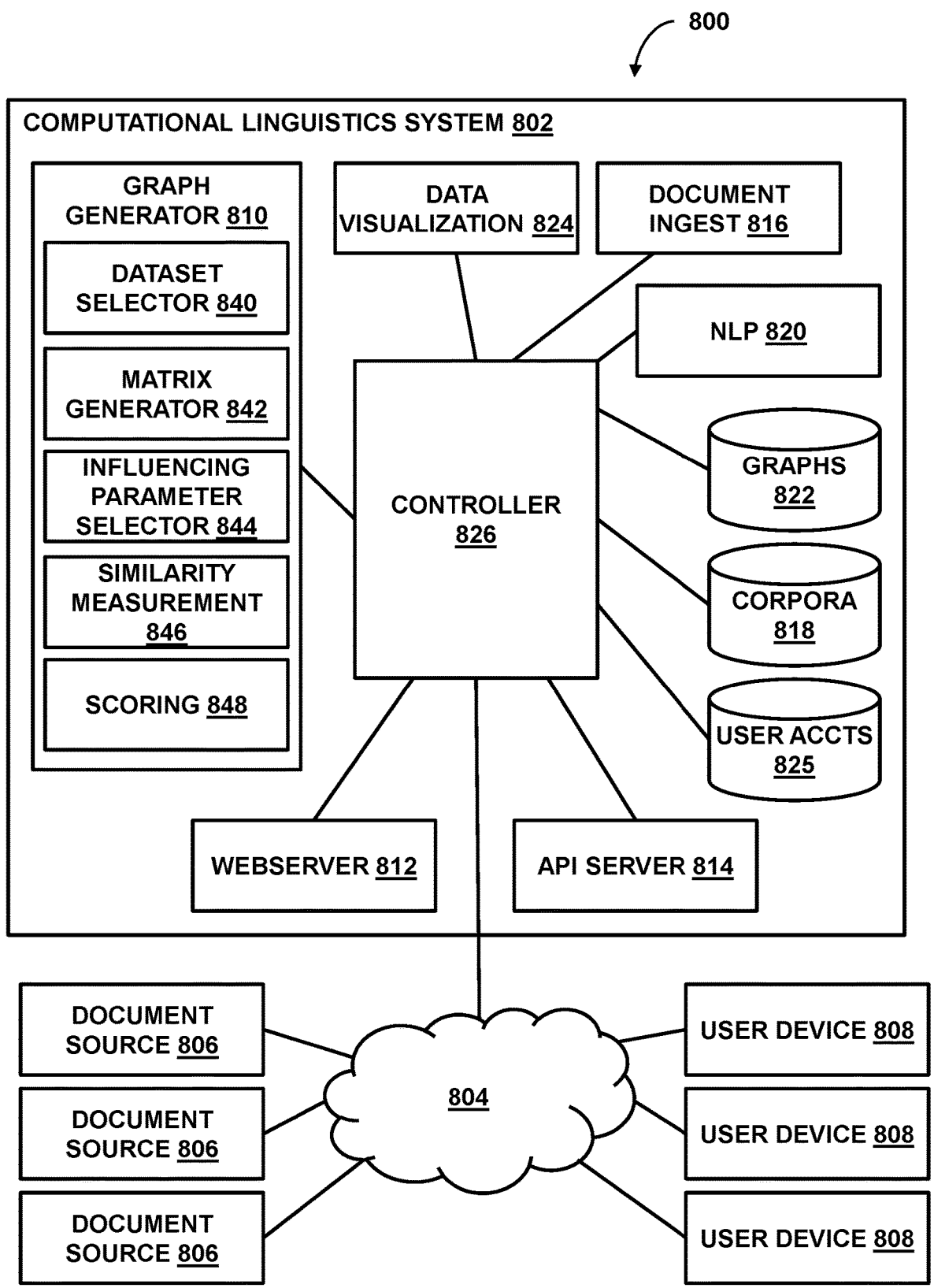
FIG. 4 is a block diagram of an example of a system configured to perform the process of FIG. 1, 2, or 3.

FIG. 4 illustrates, in block diagram form, the logical architecture of an example of a computing environment 800 in which the above-described techniques may be implemented. In some embodiments, computing environment 800 includes a computational linguistics system 802, the Internet 804, document sources 806, and a plurality of user devices 808, such as personal computers, laptops, or mobile devices having the features of the below-described computer systems. Representative devices are shown, but it should be understood that substantially more devices and instances may be used in commercial embodiments, e.g., more than 100, or more than 1,000 user devices, and more than 10, or more than 100 document sources.

In this example, subscribing users may submit queries to the computational linguistics system 802 (which may be geographically remote) via a web browser executing on user devices 808 and exchanges over the Internet 804. In some embodiments, users may submit queries to view (or otherwise interrogate, e.g., search) trends, entity relationships, sentiment relationships, term relationships, or document relationships (e.g., graphs of such relationships) determined by the computational linguistics system 802 based on unstructured plain text documents. These documents, in some cases, may be retrieved (e.g., downloaded) from content hosted by third party document sources 806, in some cases as batch downloads in advance of queries.

In some embodiments, the computational linguistics system 802 may include a graph generator 810 to perform the above-described techniques, a web server 812, an application-program interface (API) server 814, a document-ingest module 816, a corpora repository 818, a natural-language processing module 820, a graph repository 822, a data visualization module 824, a user-account repository 825, and a controller 826. The controller 826 may coordinate the described operations of the other modules. In some cases, prior to granting access, the controller 826 may confirm a user's credentials against a user account in the user-account repository 825 for security purposes and to verify whether a user account is current, e.g., a subscription fee has been paid.

In some embodiments, the graph generator 810 may execute the processes 100, 200, or 300 of FIG. 1, 2, or 3, respectively. In some embodiments, the graph generator 810 may include a dataset selector 840, a matrix generator 842, an influencing parameter selector 844, a similarity measurement module 846, a scoring module 848, or other components. In some embodiments, the dataset selector 840 may obtain data from one or more datasets. In some embodiments, the dataset selector may obtain a graph as input for graph generation, identify adjacent nodes and/or adjacent node candidates, generate queries based on the adjacent nodes and/or adjacent node candidates, send the queries, and ingest and store responsive data, as described above. In some embodiments, the matrix generator 842 may be operative to generate a matrix based on data from one or more datasets (e.g., to generate a matrix to represent a graph if the matrix form is desired and the graph is not already in the matrix form, to generate an adjacency matrix by pruning the graph, etc.). In some embodiments, the influencing parameter selector 844 may be operative to select a parameter for influencing a graph, and determine respective values of the selected influencing parameter for nodes of the graph (e.g., with respect to steps 104, 112, 302, 312, etc.). In some embodiments, the similarity measurement module 846 may be operative to determine similarity between objects (e.g., determining a value indicating similarity between the objects by assessing similarity between vectors corresponding to such objects, or other techniques). In some embodiments, the scoring module 848 may be operative to determine respective scores (e.g., related to nodes, their respective edges, their respective adjacent node or adjacent node candidates, etc.). With respect to steps 112 and 312, for example, the scoring module 848 may determine such a score related to a node based on the value indicating the amount of similarity (between the node and its adjacent node or adjacent node candidate), the value of a selected influencing parameter for the node, etc.

In some embodiments, results may be stored in memory, e.g., in the graph repository 822 in association with the corresponding graph, or results may be transmitted to a user device for display in a web browser, e.g., in response to a query for a specific graph. In some cases, visual weight or visual attributes of displayed graphs, like node or edge size, color, drop shadow, transparency, or attributes of a physics-based simulation (like in a force directed layout of a graph) may be modified based on quality measures for individual nodes or edges.

In some embodiments, computational linguistics system 802 may include a web server 812 and an application-program interface (API) server 814. These servers may listen to corresponding network ports, maintain session state for various sessions with user devices 808, advance requests and posted data to controller 826, and send responsive data to user devices 808. In some cases, responses may be in the form of web pages, like serialized bodies of markup language, cascading style sheets, and JavaScript™ instructions used by web browsers to render content, like inputs for making requests or data visualizations of query responses. In some embodiments, the API server 814 may be operative to send structured responsive data, like XML or JSON formatted responses to queries and receive machine-generated requests. In some embodiments, the servers may be blocking servers, or the servers may use various techniques to process multiple requests concurrently, e.g., with various asynchronous programming techniques, like by tracking and implementing deferreds or promises.

In some embodiments, the document-ingest module 816 may obtain collections of documents and store those documents in corpora repository 818, which may have analyzed corpora of unstructured plain text documents used to generate the presently described graphs. In some embodiments, the documents may be obtained from different document sources 806, such as remote, third-party repositories of documents, like web servers.

In some embodiments, retrieved and stored corpora are collections of unstructured text documents. In some embodiments, the unstructured text may be included within structured portions of other documents, for example, rendered text within markup instructions in a webpage, or unstructured text embedded in a serialized data format, like paragraphs within an extensible markup language document or JavaScript™ object notation document. This surrounding structure notwithstanding, in some embodiments, at least some, and in some cases most or only, the text analyzed in constructing graph topologies is unstructured text, like human readable plain text in prose form with markup instructions and scripting language instructions removed. For instance, an automated web browser, like Selenium™, may be executed to retrieve web pages, execute scripts and render markup language to construct a document object model of the webpages, and parse visible text from the web pages that is retrievable from the ".text" attribute of a DOM object containing the text. Removing the computer-readable portion is expected to cause documents to be grouped according to their content intended to be read by humans, rather than according to the programming library or practices invoked by a developer. Or some embodiments may leave this markup language and scripting instructions in place to analyze documents according to their mode of construction or to weight terms according to their visual weight when rendered or annotate terms according to their context. In some embodiments, the text may be encoded as Unicode or ASCII text.

In some cases, an analyzed corpus may be relatively large, for example, more than 100 documents, more than 1,000 documents, or more than 10,000 documents, and connections indicating semantic similarity between the documents (or entities, sentiments, terms, or the like, as described below) may be relatively numerous, e.g., more than 5 connections on average between documents, like more than 50, more than 500, or between each unique pair of documents. In some embodiments, each of the documents may also include a substantial amount of text, for instance, more than 100 words, more than 500 words, or more than 2,000 words.

In some embodiments, an analyzed corpus used to construct a graph may be relatively large. For expected use cases of the present inventions, the corpus is larger than would be economically feasible for humans to manually perform the processes 100, 200, or 300 in reasonable amounts of time, and computers are required to implement the processes 100, 200, or 300 in commercially relevant intended applications. For example, the corpus may include more than 50 documents, like more than 500, or more than 5,000 documents. Further, in some embodiments, the documents within the corpus may be relatively long, for example, having a median length of more than 50 words, like more than 500 or more than 5,000 words, depending upon the use case.

The necessity of computer implementation, even for relatively small corpora, can arise from the number of documents, the length of documents, or the semantic pairwise interrelationships between the documents, which can give rise to data structures that can grow factorially with each additional document depending upon how aggressively semantic links between documents are pruned. Due to this scaling effect, each additional document in some applications can impose substantial additional computational and memory burdens, and increasing the number of documents even by a small amount can be a nontrivial problem, particularly without the benefit of some of the techniques described herein to expedite computer processing of the analysis and conserve limited memory within a computer system.

In some embodiments, the documents within the corpus may be related in some fashion, for example, all from the same source or related to a category of topics, entities, sentiments, or the like. Examples of corpora include academic literature, like scientific literature, medical literature, economic literature, psychological-research literature, and the like, for instance, from a given journal, university, country, or academic institution. Other examples include webpages, for example, from businesses, like the 500 highest ranking business entity websites responsive to a given query, businesses within a given region, businesses in a given industry, businesses at a given state of development (like emerging businesses), or combinations thereof, like startups in Silicon Valley targeting the shipping industry to give one example. Other examples of corpora include documents hosted in government databases, like the full text patent database hosted by the United States Patent Office, regulatory filings with the Securities and Exchange Commission hosted in the Edgar database, court filings within the Pacer database, Federal Communication Commission filings, United States Food and Drug Administration filings, and the like. Another example of corpora includes various bodies of journalism, like catalogs of newspapers, magazines, and the like. Relevant corpora also include social media posts, for example, microblog posts, blog posts, posts within social networks, and the like, as well as resumes, job postings, and product manuals.

In some cases, the corpus is obtained by processing non-text documents, for example, by performing optical character recognition on image-formatted documents or by submitting photographs to image recognition and description algorithms that return a prose description of photographs. In some cases, the corpus may be obtained without metadata indicating the semantic relationships between documents within the corpus, and these relationships may be discerned, for example, with software provided by Quid of San Francisco, Calif., or by performing latent semantic analysis or other distributional semantic techniques to construct the graphs described herein. In some cases, the analysis may be performed by an unsupervised machine learning technique, or some embodiments may train supervised machine learning models (e.g., with stochastic gradient descent) based on a training set, like text data having manually-labeled features. Unsupervised methods are expected to be less expensive and more broadly applicable, as the cost and complexity of feature engineering may be reduced relative to supervised techniques, which is not to suggest that at least some embodiments are not also consistent with supervised learning.

In some embodiments, the natural-language processing module 820 may analyze these corpora and store resulting graphs in the graph repository 822, e.g., at query time or in advance, depending on acceptable latency and resources available, or in some cases partially in advance. In some cases, graphs like those described above may be obtained by subjecting a corpus to various types of distributional semantic analysis, e.g., statistical similarities measures like latent semantic analysis, random indexing, normalized Google™ distance, Best path Length On a Semantic Self-Organizing Map, Vector Generation of an Explicitly-defined Multidimensional Semantic Space, or other techniques by which the distribution of terms in documents is represented as relatively high-dimensional vectors, and semantic similarity is measured according to similarity of the vectors, for instance, cosine similarity or Minkowski distance. The analysis technique used by some embodiments may be selected based on the type of relationships to be measured, e.g., between entities or terms, versus between larger units of language, like documents or paragraphs. In some cases, a corpus may be analyzed multiple ways, yielding graphs of relationships between entities mentioned in the documents as well as graphs of relationships between the documents.

Graphs need not be labeled as a "graph" in program code to constitute a graph. Other constructs may be used to the same ends and still constitute a graph. It is enough that the arrangement of information (e.g., in program state, storage, or both) contain the attributes of the presently described graphs to constitute a graph having edges and nodes. For example, in an object-oriented programming environment, documents may be mapped to "document" objects, and those objects may have an attribute of a list of semantically similar documents each of which corresponds to a different "document" object and has a similar list referencing other documents, regardless of whether this arrangement is referred to as a "graph" in code.

In some embodiments, to measure relationships between documents (or other larger language units, like paragraphs), each document may be represented by a feature vector in which each value of the vector indicates the presence, number of occurrences, or frequency of an n-gram in the document. N-grams are sequences of one or more terms, e.g., "the" is an example of an n-gram where n=1, "the quick" is another n-gram where n=2, and "the quick brown fox jumped" is another where n=5. In some cases, relatively uninformative terms, like stop words ("the," "a," and "an" being common examples), or terms detected with term-frequency inverse document frequency (TF-IDF) scoring may be omitted.

To calculate TF-IDF for a given n-gram, some embodiments may count the number of times the n-gram occurs within a given document and the number of other n-grams in the document before calculating a frequency with which the term occurs within the document. Some embodiments may also count the number of times the n-gram occurs in a larger collection of documents, such as the analyzed corpus of a sampling thereof, as well as the total number of terms in the larger collection of documents to calculate another frequency with which the term appears in the larger collection of documents. The two resulting frequencies may be compared, for instance, dividing one frequency by the other, to determine the TF-IDF score.

Position of a value in the feature vector may correspond to one n-gram, e.g., the first position of a vector may correspond to the n-gram "jumped over," and documents containing this sequence of terms have a feature vector with value in the first position indicating that this term is present. Documents may be analyzed as a whole, or at higher resolution. For instance, in some embodiments, each document may be partitioned into paragraphs, and then, a feature vector may be constructed for each paragraph, with values of the vector corresponding to the presence of n-grams within the respective paragraph. Vectors need not be labeled as "vectors" in program code to constitute vectors, e.g., ordered lists may constitute a vector in some cases.

Because the universe of n-grams a document could contain is relatively large, and documents tend to use a relatively small portion of these n-grams, feature vectors tend to be relatively high-dimensional and sparse, having a value of zero for most values. To mitigate the burden of high-dimensionality, in some cases, feature vectors may be subjected by some embodiments to various types of dimensional reduction, like indexing, random indexing, or singular value decomposition.

In some cases, a corpus may be represented by arranging the feature vectors into a term-document matrix. For instance, each row or column may correspond to a document, and the values along the row or column may be the feature vector of that document. Thus, rows may represent documents, and columns n-grams, or vice versa.

Or in some embodiments, a document or corpus may be represented as a co-occurrence matrix, where both rows and columns represent n-grams, and values indicate the presence, number, or frequency of instances in which corresponding n-grams occur within a threshold distance of one another in the text. In some embodiments, co-occurrence matrices for documents may be appended to one another to represent a corpus in a higher-dimensional matrix, e.g., in a three dimensional corpus matrix, with each two-dimensional co-occurrence matrix corresponding to a document. Such matrices may be reduced in dimension with a number of techniques, including random indexing. Matrices need not be labeled as a "matrix" in program code to constitute a matrix, e.g., an ordered list of ordered lists may constitute a matrix.

In some cases, a variety of types of relationships may be processed with some embodiments. For instance, semantic similarity or relatedness of entities mentioned in documents, sentiments expressed in documents, or terminology in documents may be determined with computational natural language processing of unstructured plain text corpora. In some embodiments, a corresponding graph may be constructed, with documents, paragraphs, entities, sentiments, or terms as nodes, and weighted edges indicating relationships, like similarity, relatedness, species-genus relationships, synonym relationships, possession relationships, relationships in which one node acts on another node, relationships in which one node is an attribute of another, and the like. In some cases, the edges may be weighted and directed, e.g., where the relationship applies in one direction and can vary in magnitude or certainty.

Analyses of such matrices may entail operations like insertion, multiplication, and addition. As noted above, in some embodiments, matrix operations may be prohibitively slow or memory intensive for a larger datasets. A number of techniques may be used to expedite these operations and reduce memory consumption. In some embodiments, to expedite operations, matrix operations may be performed in a single instance of a computer system, for example, within a single memory address space of a single operating system, and in some cases, by holding some or all of the matrix data in program state concurrently to avoid disk access or network access latency penalties. Or, some embodiments may distribute operations on additional computing systems, which is not to imply that any other feature described herein may not also be omitted. In some embodiments, the computer system may be configured with a relatively large amount of random access memory and on-chip cash memory to these ends.

In some cases, some of the sparse-matrices described above may consume a relatively large amount of memory using some traditional techniques. To conserve memory, some embodiments may compress the sparse matrices, for example, by decomposing a matrix into vectors, and translating the vectors into an index indicating which vector scalars have a nonzero value and corresponding indications of those values. Some embodiments may compress such vectors with run-length coding of values of those values that are zero. Some examples may compress sparse matrices as a dictionary of key, a list of lists, a coordinate list, a compressed sparse row, or a compressed sparse column. In some cases, such matrices, or portions of sparse matrices, may be expanded for some vector operations and then re-compressed after and before, respectively, the sparse matrices, or portions thereof, are moved upward in a memory hierarchy towards a processor.

Various encodings may be selected to improve the functioning of a computer system. In some cases, values of matrices, like weights, may be normalized, for example, ranging between zero and one or as 8, 16, or 32 bit binary values having a number of digits selected in view of an operating system, register size, memory bust size, and other hardware constraints of a computer system upon which the above processes are to be run to expedite operations and conserve memory.

Some embodiments may determine document similarity based on latent semantic analysis of unstructured text in the documents. For instance, some embodiments may create a term document matrix of the documents. Then, the term-document matrix may be transformed with singular value decomposition (SVD) to map documents to concepts expressed by the terms. Documents having similar concepts may be deemed similar, e.g., based on similarity of concept vectors for the documents yielded by SVD. In some cases, terms appearing with more than a threshold frequency in the documents may be determined and weighted according to TF-IDF. In some cases, the resulting weighted term document matrix may be decomposed by determining two vectors, that when multiplied, approximate the matrix. In some embodiments, error between the approximation and the matrix may be determined, and the error may be decomposed by determining two more vectors that when multiplied approximate the matrix of errors. This process may be repeated until an aggregate error is determined to be smaller than a threshold. A threshold number (e.g., the second and third) of the resulting vectors may correspond to dimensions in a concept space, where the concepts that emerge correspond to co-occurrence of terms in documents indicated by clusters in the space. Documents may be clustered according to their corresponding vectors in the concept space, or similarity of documents may be determined by some embodiments by comparing their respective vectors in this space, e.g., based on cosine similarity or other measures.

In some cases, high dimensional sparse vectors may be reduced in dimension with random indexing. For instance, document text may be represented in a co-occurrence matrix, where rows represent n-grams, columns represent adjacent n-grams (like within a threshold number of words in the text), or vice versa, and values represent presence, number, or frequency of instances in which corresponding terms are determined to be adjacent to one another in the text. In some cases, to reduce memory consumption of sparse vectors in such a semantic similarity analysis, a co-occurrence matrix may be created by representing adjacent n-grams as vectors that are smaller (e.g., substantially smaller) than the number of potential adjacent n-grams and are made generally distinguishable from one another by randomly (e.g., pseudo-randomly) assigning values, like 0, +1, or −1. As adjacent n-grams are encountered during parsing, corresponding rows or columns of n-grams in the co-occurrence matrix may be updated by summing current values of the row or column with corresponding values of the adjacent n-gram vector. Similarity of n-grams (and corresponding entities) may be determined based on similarity of resulting vectors in the co-occurrence matrix, e.g., based on cosine similarity.

In some cases, similarity (or other relationships) between larger language units may be determined. For instance, in some cases, a feature vector may be determined for documents in a corpus. Some embodiments may execute a density-based clustering algorithm, like DBSCAN, to establish groups corresponding to the resulting clusters and exclude outliers. To cluster according to vectors, some embodiments may iterate through each of the vectors reflected in the records and designate a vector as a core location in vector space if at least a threshold number of the other vectors in the records are within a threshold distance in vector space. Some embodiments may then iterate through each of the vectors and create a graph of reachable vectors, where nodes on the graph are identified in response to non-core corresponding vectors being within a threshold distance of a core vector in the graph, and in response to core vectors in the graph being reachable by other core vectors in the graph, where two vectors are reachable from one another if there is a path from one vector to the other vector where every link and the path is a core vector and it is within a threshold distance of one another. The set of nodes in each resulting graph, in some embodiments, may be designated as a cluster, and points excluded from the graphs may be designated as outliers that do not correspond to clusters.

In some cases, when performing these operations, movements within a memory hierarchy of a computer system (e.g., from storage, to dynamic random access memory, to L3 cache, to L2 cache, to processor registers) may be relatively slow, and memory space may be particularly limited higher in the hierarchy, closer to the processor. For example, access to data stored in registers of a processor, such as a CPU or graphics processing unit, may be relatively fast, while the amount of available storage may be relatively low. Level 2 and level 3 cache, respectively, may offer trade-offs of increasing magnitude, exchanging slower access times for greater storage space. Similarly, dynamic random access memory may offer even greater storage, though access times may be several orders of magnitude slower than the registers or cache memory, and persistent system storage, such as a hard disk or solid-state drive) may extend this trade-off even further. In some embodiments, matrices may be large enough that during operation substantial portions of the matrix, for example, most of the matrix, cannot fit into the higher levels of a memory hierarchy, and portions of the matrix may be swapped in and out of the higher levels of memory hierarchy during operations on those portions. As a result, in some embodiments, movement of data between levels of the memory hierarchy may account for a substantial portion of the computing resources, e.g., time and memory, consumed by a matrix operation. As some use cases reach relatively large scales, this consumption of computing resources may become prohibitive.

In some embodiments a blocking algorithm may be executed during certain matrix operations, for example, when multiplying two dense matrices or a dense matrix by a sparse matrix, to improve the functioning of the computer system and reduce the amount of time spent shifting data back and forth between levels of a memory hierarchy. In some embodiments, upon initiating a matrix multiplication, one or both of the matrices may be subdivided into blocks (e.g., tiles), each having a plurality of contiguous values within the respective matrix within a plurality of a sequence of rows and columns, for instance, those values that are both in the first 8 columns and in the first 8 rows might constitute one tile. In some embodiments, tile size may be selected based on the amount of available memory at various levels of a memory hierarchy, such that a given tile can fit within a targeted level of the hierarchy, like the level 2 or level 3 cache. Next, some embodiments may iterate through the tiles, loading the tiles into a higher level of the memory hierarchy, and then performing operations with that tile. In some embodiments, a given tile, after being loaded into the higher level of the memory hierarchy, may be applied to update each implicated value of a product matrix. In some cases, the values of the product matrix may be initially set to zero, and then those values may accumulate updates as tiles are loaded and processed, until all of the tiles have been processed, and the final value of the resultant matrix is known. In some cases, updating a given value may include summing an existing value with one or more products of values within a tile that has been loaded into the higher level of the memory hierarchy. References to higher and lower levels of memory hierarchy, rather than specific levels, are intended to indicate the applicability of this approach to different levels of the hierarchy, for example, the higher and lower levels may be level 2 cache and dynamic random access memory respectively or level 2 cache and level 3 cache respectively. In some cases, multiple levels of tiling may be performed, e.g., a tile loaded into cache may be sub-divided into register-sized sub-tiles. In some cases, some of the techniques for accelerating matrix or vector operations or conserving memory may be implemented by invoking appropriate sequences of commands in a basic linear algebra subroutine library, like level 1, 2, or 3 commands.

In some embodiments, the data visualization module 824 may be operative to prepare data visualizations for display on user devices, e.g., visualizations of the graphs described herein. In some cases, such visualizations may include physics-based arrangements of nodes within a display, like a force-directed layout. In some cases, graph generation and visualization preparation takes place on computational linguistics system 802, and resulting interactive visualizations run (e.g., entirely) in a web browser of a user device. In some cases, this entails displaying and manipulating thousands of vertices and edges in an environment on user devices not known for speed. At the same time, in some use cases, users desire a relatively large amount of data on display, while keeping a responsive frame rate. To increase frame rate, some embodiments may use various techniques to optimize the network visualization and make the computer system run faster, including invoking WebGL commands to enlist a user's GPU in rendering a web page and pre-processing.

Graphs of real-world information are often relatively intricate. In some embodiments, visualizations may support real-time (e.g., in this context, with less than 500 ms latency) interactions with relatively large numbers of interactive objects, e.g., more than 500, like more than 1,000, and in some cases as many as 20,000 interactive objects with near zero latency. In some embodiments, this speed is accomplished by pre-processing physics models of graph layouts with a graphical processing units (GPUs) of the computational linguistics system 802, to reduce the computational burden on less powerful CPUs executing browsers on user devices. In some cases, displays may be relatively high dimensional, e.g., various visual attributes, like line weight, icon size, color, transparency, drop shadow offsets, or properties of physical models, like inertia, friction, attractive forces, repulsive forces, momentum, frequency of oscillation, and the like, may be mapped to different dimensions like those discussed above, e.g., similarity, relatedness, sentiment, and the like. Connections tend to be more relatively complicated and irregular, and embodiments often do not determine the visual shape of the graph ahead of time. Indeed, graph isomorphism provides for a relatively large number of visual arrangements of otherwise identical graphs, but many arrangements are relatively un-informative and difficult to visually parse to a human user consuming the resultant data.

To visualize graph relations, some embodiments of data visualization module 824 may arrange vertices (also referred to as nodes) and edges using a physics simulation that mimics the stretching of spider webs. Some spider-web-inspired representations may model interactions between each pair of vertices as a Coulomb-like repulsion and an additional Hooke-like attraction in the presence of an edge between the pair. A relatively weak gravitation-like force may be modeled to prevent separate components and isolated vertices from venturing too far from the network's center of mass. Thus, some embodiments may use this physics-based network layout. In some cases, the parameters and initial conditions of the physics based model may be determined by data visualization module 824, and instructions for executing the model and adjusting the model based on user input may be sent to the user device, e.g., in the form of JavaScript™ instructions for that model, for instance, a user selecting and dragging a node as a force applied to the physics model. Embodiments are expected to appear relatively natural, and the hierarchy of a network's structure is expected to be readily apparent; both small and large network structures are exposed, which is expected to allow users to study relationships between groups of vertices on different scales.

Running a physics simulation in a user's browser can easily exceed the available computing resources, as the simulation can be inherently resource-intensive for larger, highly connected data sets. To mitigate this issue, some embodiments may exploit phenomena expected to arise as the size of the data scales. It is expected that, in some embodiments, the number of time steps consumed to achieve equilibrium starting with a random configuration of vertices scales linearly with the number of vertices. That is undesirable for presentation purposes (though some embodiments are consistent with this approach, particularly for smaller data sets). To mitigate this, some embodiments may arrange for initial conditions of the simulation so the equilibrium is attained faster.

To select initial conditions of the physics-based animation of this n-body system, some embodiments may perform a gradient descent optimization. Some embodiments may compute the gradient of the modeled system's energy (e.g., based on the forces affecting nodes), integrate that to compute momentum, and move the particles in the simulation representing nodes accordingly. Initial conditions of the gradient descent may be selected strategically in some cases to mitigate the effects of local minima in what is expected to be a relatively rough energy landscape (though embodiments are also consistent with random selection of initial conditions, like with a stochastic gradient descent). For instance, some embodiments may seed the simulation with a vertex configuration that is in the vicinity of the final destination. To this end, some embodiments may execute a discretized version of the problem and search through all vertex configurations on a 2D grid.

This process is still of combinatorial complexity, however, and may generally be too expensive for some larger graphs. To mitigate this issue further some embodiments may simplify the search space to one dimension with space filling curves, like a z-curve or Hilbert curve that covers a 2D region of space with a one-dimensional curve. Such space-filling curves may be constructed via an iterative process, whereby at each step of the iteration the curve is refined at ever-finer scales. By ceasing iterations at a finite step, some embodiments may obtain a curve with just enough points to accommodate the data at issue. Further benefits, in some embodiments may arise from the property of some space-filling curves: the 2D distance between any pair of vertices is well-approximated by (the square root of) the distance along the curve. In this scenario, in some embodiments, the problem of finding an approximate 2D layout is equivalent to finding an energy-optimal linear ordering of vertices, which some embodiments may use to implement less computationally intensive heuristics, circumventing the initial combinatorial complexity. That said, not all embodiments provide this benefit, as the various inventions described herein are independently useful.

Figure 5:
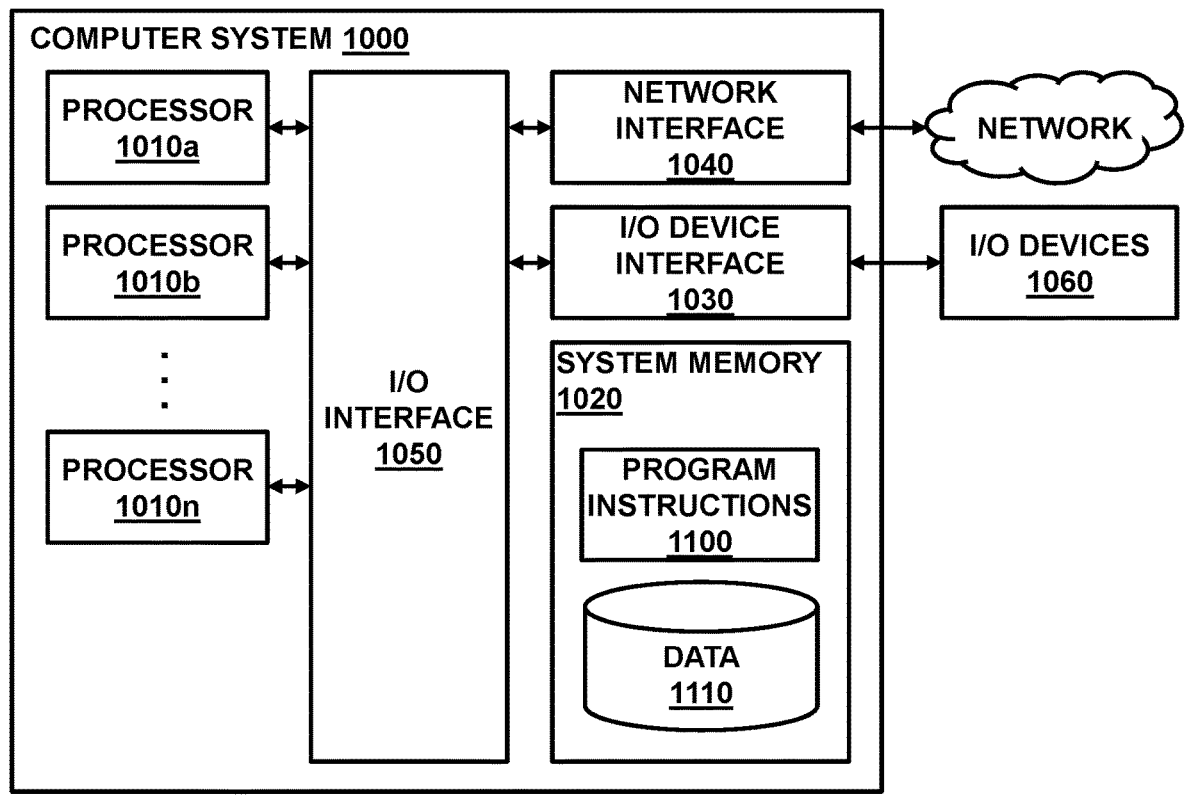
FIG. 5 is a block diagram of an example of a computer system by which the above-techniques may be implemented.

FIG. 5 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010*a*), or a multi-processor system including any number of suitable processors (e.g., 1010*a*-1010*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010*a*-1010*n*) to implement one or more embodiments of the present techniques. Program instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010*a*-1010*n*) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times, e.g., a copy may be created by writing program code to a first-in-first-out buffer in a network interface, where some of the instructions are pushed out of the buffer before other portions of the instructions are written to the buffer, with all of the instructions residing in memory on the buffer, just not all at the same time.

I/O interface 1050 may be configured to coordinate I/O traffic between processors 1010*a*-1010*n*, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010*a*-1010*n*). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present invention may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several inventions. Rather than separating those inventions into multiple isolated patent applications, applicants have grouped these inventions into a single document because their related subject matter lends itself to economies in the application process. But the distinct advantages and aspects of such inventions should not be conflated. In some cases, embodiments address all of the deficiencies noted herein, but it should be understood that the inventions are independently useful, and some embodiments address only a subset of such problems or offer other, unmentioned benefits that will be apparent to those of skill in the art reviewing the present disclosure. Due to costs constraints, some inventions disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such inventions or all aspects of such inventions.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "an element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, any such conflicting text in such incorporated by reference U.S. patents, U.S. patent applications, and other materials is specifically not incorporated by reference in this patent.

The present techniques will be better understood with reference to the following enumerated embodiments:

1. A method comprising: obtaining a graph comprising more than 1000 nodes and more than 2000 edges, each of the edges linking two of the nodes and having a value indicating an amount of similarity between objects corresponding to the two linked nodes, and the graph being generated from a natural language processing of a corpus of unstructured documents; after obtaining the graph, selecting a parameter for influencing the graph, the influencing parameter being selected from a source other than text of the unstructured documents; for each of at least 100 evaluation nodes among the nodes of the graph, assessing, by one or more processors, the number of edges of the evaluation node based on the selected influencing parameter, wherein an evaluation node is a node selected to be evaluated, and wherein assessing the number of edges comprises, with respect to each adjacent node in the graph sharing an edge with the evaluation node: determining the value indicating the amount of similarity between the object corresponding to the evaluation node and the object corresponding to the adjacent node; determining a score related to the edge shared with the evaluation node, the score determined based on the value indicating the amount of similarity and a value of the selected influencing parameter for the evaluation node; determining whether the score satisfies a threshold score for maintaining a shared edge; and removing the edge shared with the evaluation node in response to the score not satisfying the threshold score; and preparing, based on the graph resulting from the assessment of the number of edges of the evaluation nodes, instructions to display at least part of the resulting graph.

2. The method of embodiment 1, wherein assessing the number of edges comprises, with respect to each of the nodes of the graph that is an adjacent node candidate of the evaluation node: determining a value indicating an amount of similarity between the object corresponding to the evaluation node and the object corresponding to the adjacent node candidate; determining a score related to the adjacent node candidate, the score determined based on the value indicating the amount of similarity and the value of the selected influencing parameter for the evaluation node; determining whether the score satisfies the threshold score for maintaining a shared edge; and adding an edge linking the evaluation node and the adjacent node candidate based on the score satisfying the threshold score such that the adjacent node candidate is an adjacent node that shares the added edge with the evaluation node.

3. The method of embodiments 1-2, wherein, with respect to each evaluation node among the nodes of the graph: extracting an entity from the object corresponding to the evaluation node; and selecting one or more nodes of the graph as adjacent node candidates of the evaluation node based on the extracted entity.

4. The method of embodiment 3, wherein selecting the one or more nodes based on the extracted entity comprises: accessing an index of topics of documents to identify the one or more nodes as nodes that correspond to at least one document about the entity.

5. The method of embodiments 1-4, wherein: the graph comprises a weighted semantic graph of semantic similarity between unstructured text in documents within an analyzed corpus; weights of the semantic graph are inferred by unsupervised learning of the weights by one or more computers; and each of the nodes of the graph correspond to at least one respective document within the analyzed corpus.

6. The method of embodiment 5, wherein determining the value indicating the amount of similarity between the object corresponding to the evaluation node and the object corresponding to the adjacent node comprises: obtaining a first vector corresponding to the document that corresponds to the evaluation node and a second vector corresponding to the document that corresponds to the adjacent node; determining similarity between the first vector and the second vector; and determining the value indicating the amount of similarity between the document corresponding to the evaluation node and the document corresponding to the adjacent node based on the similarity between the first vector and the second vector.

7. The method of embodiment 5, wherein, with respect to the evaluation node and each adjacent node in the graph sharing an edge with the evaluation node: an n-gram representation of the document corresponding to the evaluation node is obtained and encoded as at least part of a first n-gram matrix; an n-gram representation of the document corresponding to the adjacent node is obtained and encoded as at least part of a second n-gram matrix; and the value indicating the amount of similarity is determined based on the first n-gram matrix and the second n-gram matrix.

8. The method of embodiment 7, wherein determining the value indicating the amount of similarity between the object corresponding to the evaluation node and the object corresponding to the adjacent node comprises: selecting a first vector in the first n-gram matrix and a second vector in the second n-gram matrix; performing steps for determining similarity between the first vector and the second vector; and determining the value indicating the amount of similarity between the document corresponding to the evaluation node and the document corresponding to the adjacent node based on the similarity between the first vector and the second vector.

9. The method of embodiment 1-8, wherein determining the value indicating the amount of similarity comprises performing steps for determining the value indicating the amount of similarity between the object corresponding to the evaluation node and the object corresponding to the adjacent node.

10. The method of embodiment 1-8, wherein selecting the influencing parameter comprises selecting the influencing parameter from a plurality of metadata parameters of documents corresponding to one or more of the nodes or from information external to the corpus from which the graph was generated.

11. A system, comprising: one or more processors; memory storing instructions that when executed by at least some of the processors effectuate operations comprising: obtaining a graph comprising nodes and edges, each of the edges linking two of the nodes and having a value indicating an amount of similarity between objects corresponding to the two linked nodes; selecting a parameter for influencing the graph; assessing each of the nodes based on the selected influencing parameter, wherein assessing each of the nodes comprises, with respect to each adjacent node in the graph sharing an edge with the node: determining the value indicating the amount of similarity between the object corresponding to the node and the object corresponding to the adjacent node; and determining a score related to the edge shared with the node, the score determined based on the value indicating the amount of similarity and a value of the selected influencing parameter for the node; and preparing, based on the graph comprising the determined edge scores, instructions to display at least part of the graph.

12. The system of embodiment 11, wherein assessing each of the nodes comprises, with respect to each adjacent node in the graph sharing an edge with the node: determining whether the score satisfies a threshold score for maintaining a shared edge; and removing the edge shared with the node in response to the score not satisfying the threshold score; and wherein preparing the display instructions comprises preparing, based on the graph resulting from the assessment of the nodes, the instructions to display at least part of the resulting graph.

13. The system of embodiments 11-12, wherein assessing each of the nodes comprises, with respect to the node and each node of the graph that is an adjacent node candidate of the node: determining a value indicating an amount of similarity between the object corresponding to the node and the object corresponding to the adjacent node candidate; determining a score related to the adjacent node candidate, the score determined based on the value indicating the amount of similarity and the value of the selected influencing parameter for the node; determining whether the score satisfies the threshold score for maintaining a shared edge; and adding an edge linking the node and the adjacent node candidate based on the score satisfying the threshold score such that the adjacent node candidate is an adjacent node that shares the added edge with the node.

14. The system of embodiments 11-13, wherein: the graph comprises a weighted semantic graph of semantic similar between unstructured text in documents within an analyzed corpus; weights of the semantic graph are inferred by unsupervised learning of the weights by one or more computers; and each of the nodes of the graph correspond to at least one respective document within the analyzed corpus.

15. The system of embodiment 14, wherein determining the value indicating the amount of similarity between the object corresponding to the node and the object corresponding to the adjacent node comprises: obtaining a first vector corresponding to the document that corresponds to the node and a second vector corresponding to the document that corresponds to the adjacent node; determining similarity between the first vector and the second vector; and determining the value indicating the amount of similarity between the document corresponding to the node and the document corresponding to the adjacent node based on the similarity between the first vector and the second vector.

16. A method comprising: selecting a parameter for influencing a graph; determining nodes for the graph and one or more adjacent node candidates for each of the nodes; with respect to each of the nodes and each adjacent node candidate of the node: determining a value indicating an amount of similarity between an object corresponding to the node and an object corresponding to the adjacent node candidate; determining a score related to the adjacent node candidate, the score determined based on the value indicating the amount of similarity and a value of the selected influencing parameter for the node; determining whether the score satisfies a threshold score for maintaining a shared edge; and adding an edge linking the node and the adjacent node candidate based on the score satisfying the threshold score such that the adjacent node candidate is an adjacent node that shares the added edge with the node; and preparing, based on the graph, instructions to display at least part of the graph.

17. The method of embodiment 16, wherein, for each node among the nodes: extracting an entity from the object corresponding to the node; and selecting one or more nodes of the graph as adjacent node candidates of the node based on the extracted entity.

18. The method of embodiment 17, wherein selecting the one or more nodes based on the extracted entity comprises: accessing an index of topics of documents to identify the one or more nodes as nodes that correspond to at least one document about the entity.

19. The method of embodiments 16-18, wherein the objects corresponding to the nodes comprise documents in a corpus, and wherein determining the value indicating the amount of similarity between the object corresponding to the node and the object corresponding to the adjacent node candidate comprises: obtaining a first vector corresponding to the document that corresponds to the node and a second vector corresponding to the document that corresponds to the adjacent node candidate; determining similarity between the first vector and the second vector; and determining the value indicating the amount of similarity between the document corresponding to the node and the document corresponding to the adjacent node candidate based on the similarity between the first vector and the second vector.

20. The method of embodiments 16-19, wherein the objects corresponding to the nodes comprise documents in a corpus, and wherein, with respect to each of the nodes and each adjacent node candidate of the node: an n-gram representation of the document corresponding to the node is obtained and encoded as at least part of a first n-gram matrix; an n-gram representation of the document corresponding to the adjacent node is obtained and encoded as at least part of a second n-gram matrix; and the value indicating the amount of similarity is determined based on the first n-gram matrix and the second n-gram matrix.

21. A tangible, non-transitory, machine-readable medium storing instructions that when executed by a data processing apparatus cause the data processing apparatus to perform operations comprising those of any of embodiments 1-20.

22. A system, comprising: one or more processors; and memory storing instructions that when executed by the processors cause the processors to effectuate operations comprising those of any of embodiments 1-10 and 16-20.

23. A method, comprising: the operations of any of embodiments 11-15.

What is claimed is:

1. A method comprising:
   obtaining a graph indicating relationships between nodes of the graph;
   forming, by one or more processors, an adjusted graph by adjusting at least some of the relationships indicated by the graph, wherein:
      the at least some relationships are adjusted based on one or more influencing values;
      the one or more influencing values are associated with one or more nodes having an adjusted relationship after the relationship is adjusted;
      the relationships indicated by the obtained graph are based on attribute values other than the one or more influencing values; and
      adjusting the at least some relationships comprises adjusting a first relationship between two nodes based on (i) the one or more influencing values and (ii) a first relationship value associated with the first relationship; and
   causing the adjusted graph, or a visualization based thereon, to be displayed.

2. The method of claim 1, wherein the relationships indicated by the obtained graph comprises relationships between objects corresponding to the nodes of the graph, and wherein adjusting the at least some relationships comprises adjusting one or more of the relationships between the corresponding objects.

3. The method of claim 1, wherein adjusting the at least some relationships comprises removing an edge between two nodes based on (i) the one or more influencing values and (ii) a first relationship value associated with a first relationship between the two nodes.

4. The method of claim 1, wherein adjusting the at least some relationships comprises adding an edge between two nodes based on (i) the one or more influencing values and (ii) a first relationship value associated with a first relationship between the two nodes.

5. The method of claim 1, comprising:
   determining a score for a first relationship between two nodes based on (i) the one or more influencing values and (ii) a first relationship value associated with the first relationship,
   wherein adjusting the at least some relationships comprises adjusting the first relationship based on the score for the first relationship.

6. The method of claim 1, comprising:
   obtaining the one or more influencing values based on information from one or more data collections external to a corpus from which the obtained graph was formed.

7. The method of claim 6, wherein obtaining the one or more influencing values comprises extracting the one or more influencing values from the information from the one or more external data collections.

8. The method of claim 1, wherein the one or more influencing values are based on one or more amounts of social sharing of objects corresponding to the nodes of the graph.

9. The method of claim 1, wherein the one or more influencing values are based on one or more amounts of followers of objects corresponding to the nodes of the graph.

10. The method of claim 1, wherein:
    forming the adjusted graph comprises steps for assessing nodes based on a selected influencing parameter.

11. A system comprising:
    one or more processors; and
    memory storing instructions that when executed by at least some of the one or more processors effectuate operations comprising:
    obtaining a graph indicating relationships between nodes of the graph;
    forming, by one or more processors, an adjusted graph by adjusting at least some of the relationships indicated by the graph, wherein:
       the at least some relationships are adjusted based on one or more influencing values;
       the one or more influencing values are associated with one or more nodes having an adjusted relationship after the relationship is adjusted;
       the relationships indicated by the obtained graph are based on attribute values other than the one or more influencing values; and
       adjusting the at least some relationships comprises adjusting a first relationship between two nodes based on (i) the one or more influencing values and (ii) a first relationship value associated with the first relationship; and
    causing the adjusted graph to be displayed or stored.

12. The system of claim 11, wherein the relationships indicated by the obtained graph comprises relationships between objects corresponding to the nodes of the graph, and wherein adjusting the at least some relationships comprises adjusting one or more of the relationships between the corresponding objects.

13. The system of claim 11, wherein adjusting the at least some relationships comprises removing an edge between two nodes based on (i) the one or more influencing values and (ii) a first relationship value associated with a first relationship between the two nodes.

14. The system of claim 11, wherein adjusting the at least some relationships comprises adding an edge between two nodes based on (i) the one or more influencing values and (ii) a first relationship value associated with a first relationship between the two nodes.

15. The system of claim 11, comprising:
    memory storing instructions that when executed by at least some of the one or more processors effectuate operations comprising:
       determining a score for a first relationship between two nodes based on (i) the one or more influencing values and (ii) a first relationship value associated with the first relationship,
       wherein adjusting the at least some relationships comprises adjusting the first relationship based on the score for the first relationship.

16. The system of claim 11, comprising:
    memory storing instructions that when executed by at least some of the one or more processors effectuate operations comprising:

obtaining the one or more influencing values based on information from one or more data collections external to a corpus from which the obtained graph was formed.

17. The system of claim 16, wherein obtaining the one or more influencing values comprises extracting the one or more influencing values from the information from the one or more external data collections.

18. The system of claim 11, wherein the one or more influencing values are based on one or more amounts of social sharing of objects corresponding to the nodes of the graph.

19. The system of claim 11, wherein the one or more influencing values are based on one or more amounts of followers of objects corresponding to the nodes of the graph.

20. The system of claim 11, wherein the operations comprise:
   forming the adjusted graph comprises steps for assessing nodes based on a selected influencing parameter.

* * * * *